United States Patent
Peck

(10) Patent No.: US 7,316,009 B2
(45) Date of Patent: Jan. 1, 2008

(54) EMULATION OF A PROGRAMMABLE HARDWARE ELEMENT

(75) Inventor: Joseph E. Peck, Hutto, TX (US)

(73) Assignee: National Instruments Corporation, Austin, TX (US)

( * ) Notice: Subject to any disclaimer, the term of this patent is extended or adjusted under 35 U.S.C. 154(b) by 742 days.

(21) Appl. No.: 10/635,078

(22) Filed: Aug. 6, 2003

(65) Prior Publication Data

US 2005/0034102 A1    Feb. 10, 2005

(51) Int. Cl.
G06F 9/45 (2006.01)

(52) U.S. Cl. ..................................... 717/138

(58) Field of Classification Search ............... 717/114, 717/156, 132–133, 138; 703/14, 20, 23, 703/27; 702/180, 182; 716/5, 16, 17
See application file for complete search history.

(56) References Cited

U.S. PATENT DOCUMENTS

| | | | |
|---|---|---|---|
| 5,911,059 A | 6/1999 | Profit, Jr. ...................... | 703/23 |
| 5,937,179 A | 8/1999 | Swoboda ...................... | 716/16 |
| 6,009,256 A * | 12/1999 | Tseng et al. ................... | 703/13 |
| 6,202,044 B1 | 3/2001 | Tzori ........................... | 703/28 |
| 6,546,524 B1 * | 4/2003 | Chankramath et al. ........ | 716/4 |
| 6,665,855 B2 | 12/2003 | Payne et al. ................... | 716/18 |
| 6,983,456 B2 * | 1/2006 | Poznanovic et al. ......... | 717/133 |
| 2003/0101022 A1 * | 5/2003 | Shah et al. .................. | 702/186 |

* cited by examiner

Primary Examiner—Tuan A Vu
(74) Attorney, Agent, or Firm—Meyertons Hood Kivlin Kowert & Goetzel, P.C.; Jeffrey C. Hood; Mark S. Williams

(57) ABSTRACT

System and method for debugging a program intended for execution on a programmable hardware element (PHE) to perform a function. A first portion of the program is converted into a first hardware configuration program (HCP) deployable on the PHE, where a remaining portion is to be debugged by a user. The PHE is configured with the first HCP, and the program executed, including the PHE executing the first portion of the program, and the computer system executing the remaining portion, which is then analyzed and debugged in response to being executed, and user input received modifying the remaining portion to debug the remaining portion. The method is repeated, where in each iteration the first portion is a successively larger portion of the program. After being debugged, the program is converted into a second HCP deployable on the PHE to perform the function, and the PHE configured with the second HCP.

32 Claims, 10 Drawing Sheets

EMULATION OF A PROGRAMMABLE HARDWARE ELEMENT

FIELD OF THE INVENTION

The present invention relates to program debugging, and particularly to debugging programs intended for execution on a programmable hardware element, such as a field programmable gate array.

DESCRIPTION OF THE RELATED ART

Scientists and engineers often use measurement or instrumentation systems to perform a variety of functions, including laboratory research, process monitoring and control, data logging, analytical chemistry, test and analysis of physical phenomena, and control of mechanical or electrical machinery, to name a few examples. An instrumentation system typically includes transducers and other detecting means for providing "field" electrical signals representing a process, physical phenomena, equipment being monitored or measured, etc. Exemplary transducers include thermocouples, strain gauges, pressure sensors, microphones and cameras. As one example, detectors and/or sensors are used to sense the on/off state of power circuits, proximity switches, push-button switches, thermostats, relays or even the presence of positive or negative digital logic-level signals. The instrumentation system typically also includes interface hardware for receiving the measured field signals and providing them to a processing system, such as a personal computer. The processing system typically performs data analysis and presentation for appropriately analyzing and displaying the measured data.

Often, the field signals may comprise high common-mode voltages, ground loops, or voltage spikes that often occur in industrial or research environments which could damage the computer system. In that case, the instrumentation system typically includes signal conditioning circuitry, such as isolation circuitry, e.g., opto-couplers, for eliminating ground-loop problems and isolating the computer from potentially damaging voltages. Signal conditioning modules are typically provided for conditioning the raw field voltage signals by amplifying, isolating, filtering or otherwise converting the signals to appropriate signals for the computer system. In some systems, the analog signals are then provided to a plug-in data acquisition (DAQ) input/output (I/O) board, which is plugged into one of the I/O slots of a computer system. The DAQ board may include analog-to-digital (A/D) converters for converting the analog signals to corresponding digital signals. The computer system may have an I/O bus and connectors or slots for receiving I/O boards. Of course, other types of computer systems and I/O buses may be used to implement a processing system.

In general, measurement and control cards or devices have a particular set of resources on-board for use in measurement or control tasks, such as counters, analog to digital converters (ADC), I/O ports, filters, etc. This is especially true with respect to mass produced cards or devices, such as National Instruments MIO (Multifunction I/O) DAQ (Data Acquisition) series. These devices typically include a set of resources which meets the needs of a large majority of users. For example, a typical card may include a 16 channel multiplexed AI (analog input) in front of an A/D (analog to digital) converter, 2 analog outputs (AO), 8 digital lines, ~10 timing/triggering lines, 2 general purpose counters, plus one or more timing/triggering engines. In some systems, one or more hardware resources may be provided for use by the system in the form of modular components or cartridges, such as I/O cartridges and/or measurement modules which may be inserted, for example, into a chassis prior to runtime of the application and accessed by the application during execution.

Increasingly, programmable hardware elements have been included in devices, such as simulation, measurement and control devices, where the programmable hardware element is configurable to perform a function, such as simulation or modeling of a device, a measurement and/or control function, modeling or simulation function, or any other type of function. Typically, a software program, e.g., a text based program or a graphical program, such as may be developed in National Instruments Corporation's LabVIEW graphical development environment, is developed either manually or programmatically, and converted into a hardware configuration program, e.g., a netlist, which is then deployed onto the programmable hardware element, thereby configuring the programmable hardware element to perform the function. For example, the programmable hardware element may be a field programmable gate array (FPGA). Similarly, the program may be an FPGA VI, operable to be deployed to the FPGA.

In computer software and hardware development, debugging is the process of locating, fixing, or bypassing "bugs" (errors) in computer program code or the engineering of a hardware device. Debugging a program or hardware device may involve identifying a problem, isolating the source of the problem, and then fixing it. A user of a program that does not know how to fix the problem may learn enough about the problem to be able to avoid it until it is permanently fixed.

Debugging is a necessary process in almost any software or hardware development process, whether a commercial product or an enterprise or personal application program. For complex products, debugging may be performed for the smallest unit of a system, again at component test when parts are brought together, again at system test when the product is used with other existing products, and again during customer beta test, when users try the product out in a real world situation. Because most computer programs and many programmed hardware devices contain thousands of lines of code, almost any new product is likely to contain "bugs".

The general approach to developing a programmable hardware element based system, i.e., a reconfigurable system, is to develop a program for performing a function in a development environment, such as National Instruments LabVIEW graphical development environment, convert the program into a form suitable for loading onto the programmable hardware element, e.g., an FPGA program file (hardware configuration program), load the converted program onto the programmable hardware element, test the system by performing the function, observe the results, and iterate the above process until the performance of the function is correct and complete.

For example, National Instruments LabVIEW FPGA is a technology that creates a hardware implementation of a diagram created using the LabVIEW development environment. This allows the user to create a program, i.e., a graphical program or diagram, using the standard LabVIEW primitives for algorithms, looping, timing, triggering, etc., coupled with new I/O primitives to define the behavior of the target hardware. The typical approach used by LabVIEW users is to iterate on the design using a fast failure approach: Implement a basic design and try it. If it doesn't work make a small change and try it again. Continue with this process until the desired results are achieved.

The program is typically compiled to produce the hardware configuration program. However, depending upon the complexity of the program and/or the programmable hardware element, the compilation time may range from minutes to hours or even tens of hours. If the user needs to modify the diagram for any reason, such as fixing a bug or adding a feature, the program (e.g., the FPGA VI) must be recompiled again. This is inefficient as each compile can take substantial time depending upon the application.

Thus, the difficulty with this approach when targeting hardware is due to compile times. Typical compile times for creating software in LabVIEW are measured in seconds, or milliseconds, whereas typical compile times for programming hardware in LabVIEW range from minutes to hours. Thus, it is not efficient or feasible for many users to make a small change and wait hours to see the results.

Such compile times may make debugging the program substantially difficult, e.g., tedious and error prone, in that the typical iterative debug cycle of modifying the program, compiling the modified program, and executing the compiled program on the target system may require so much time as to make the debug process unfeasible or inordinately expensive. This difficulty may be particularly apparent in the field (as opposed to in a research, production, or manufacturing development context), where a user may need to development an application program under time constraints. Additionally, the types of information available to the user in debugging the program once it has been deployed to the programmable hardware element is generally extremely limited, making the debugging process less effective.

U.S. patent application Ser. No. 10/055,691, titled "System and Method for Debugging a Software Program" filed Oct. 29, 2001, discloses a system for emulating or simulating execution of a program on a programmable hardware element for debugging purposes prior to deploying the program onto the programmable hardware element. In that system, the program is executed on a computer system as an emulation or simulation that communicates with hardware resources coupled to the programmable hardware element through a test feed-through configuration, referred to as an emulation personality, configured on the programmable hardware element. An emulation personality can be used to minimize the number of recompiles that need to be performed during the course of application development. Generally, the user develops the application specific program, such as an FPGA VI, but now targets the emulator rather than the programmable hardware element. When the program is run, the emulation personality is downloaded to the programmable hardware element, e.g., an FPGA device, and the application specific FPGA VI executes in software on the development computer, with the exception of I/O functions which access the physical device I/O through the emulation personality. The emulation personality thus allows the software based execution of the FPGA VI to retain access to the physical device I/O. The emulation personality is generally precompiled for the target, so there is no compile step when the application specific FPGA VI is executed.

However, in some cases portions of the emulated functionality may not be sufficiently accurate in representing the operation of that portion of the program implemented on the programmable hardware element, or may have a substantially lower performance.

Therefore, improved systems and methods are desired for debugging programs intended for deployment and execution on a programmable hardware element.

SUMMARY

Various embodiments of a system and method for debugging software programs intended for deployment and execution on a programmable hardware element, e.g., an FPGA, are presented. More specifically, the system and method presented below provide a mechanism to provide the compile time advantage of a software target for portions of the program during the debugging process. It is noted that although the system and method are described primarily in terms of a measurement system, the approach is broadly applicable to any system which uses a programmable hardware element, optionally in conjunction with one or more modular hardware resources, including, but not limited to measurement (including data and image acquisition), control (including automation), modeling, and simulation, among others.

In a preferred embodiment, the host computer system may include the program, e.g., the application program, intended for deployment and execution on a reconfigurable device. The computer system may couple to the reconfigurable device via a bus, although other transmission media are also contemplated, such as a WAN, e.g., the Internet, wireless means, and so forth. The reconfigurable device preferably includes a programmable hardware element, e.g., an FPGA.

In one embodiment, the program may optionally be created, where the program is designed to perform a function. The program may be any type of program, e.g., a text based program or a graphical program. In a preferred embodiment, the program is a LabVIEW graphical program, such as a LabVIEW FPGA program, developed in the LabVIEW graphical program development environment provided by National Instruments Corporation. In one embodiment, the program may be created on the host computer system, or alternatively, the program may be created on another computer system and transferred to the host computer system.

User input indicating a first portion of the program may be received. In a preferred embodiment, a graphical user interface may be presented to the user, and may receive the user input indicating the first portion of the program. For example, the user may draw a graphical box around the desired first portion, e.g., using a pointing device such as a mouse, or the user may select graphical elements in the first portion, e.g., while holding down the shift or control key, or otherwise indicate the first portion.

Then, the first portion of the program may be converted into a first hardware configuration program which is deployable on the programmable hardware element to perform a corresponding first portion of the function, wherein a remaining portion of the program is to be debugged by a user. In other words, the user input from above may indicate that the first portion of the program is not to be debugged, i.e., that the first portion of the program is substantially stable, i.e., comprises a substantially debugged portion of the program.

The programmable hardware element may then be configured with the first hardware configuration program. In other words, the hardware configuration program may be deployed onto the programmable hardware element, thereby deploying the first portion of the program to the programmable hardware element. The configured programmable hardware element may then be operable to perform the corresponding first portion of the function.

The program may then be executed. Executing the program preferably includes the programmable hardware element executing the first portion of the program, and the computer system executing the remaining portion of the program, where the remaining portion of the program is operable to be analyzed and debugged in response to said executing. The computer system executing the remaining portion of the program may simulate (i.e., emulate) execution of the remaining portion of the program on the programmable hardware element.

User input modifying the remaining portion of the program for debugging may be received. In other words, in response to or in conjunction with executing the program, the user may analyze the program behavior and provide input indicating one or more modifications to the remaining portion of the program.

Once the program has been debugged, the program may be converted into a second hardware configuration program which is deployable on the programmable hardware element to perform the function. Note that the second hardware configuration program was generated from a substantially debugged version of the program.

Finally, the programmable hardware element may be configured with the second hardware configuration program. The reconfigurable system, including the configured programmable hardware element, may then be operable to perform the function.

In one embodiment, the steps described above may be repeated one or more times, where in each iteration the first portion of the program is a successively larger portion of the program. In other words, the debugging process described above may be performed iteratively, where at each iteration the portion of the program being debugged (the remaining portion of the program) is a smaller portion of the program.

It should be noted, however, that in other embodiments, one or more portions of the program that have been previously debugged may require further debugging, e.g., due to changes made in other parts of the program, and so may be re-incorporated into the remaining portion of the program. Thus, in one embodiment, the steps above may be repeated a plurality of times, where, in a first subset of iterations the first portion of the program is a successively larger portion of the program, and in a second subset of iterations the first portion of the program is a successively smaller portion of the program. For example, the user may move some of the (previously debugged) first portion of the program back into the remaining portion for further debugging, thereby increasing the size of the remaining portion, while decreasing the size of the first portion. Of course, over the course of the debugging process, the general trend will be for the size of the remaining portion of the program to decrease as more and more of the program is debugged.

Once the remaining portion of the program has been substantially debugged, then the conversion of the program may be performed, generating the second hardware configuration program, and the generated second hardware configuration program deployed to the programmable hardware element as described above.

Thus, either in a single pass or over multiple iterations, a portion or portions of the application program may be executed on the computer system as an emulation or simulation of execution of the portion or portions on the programmable hardware element, where the other portion or portions of the program, preferably those portions that are substantially debugged, i.e., are stable, are executed on the reconfigurable device, i.e., on the programmable hardware element.

In some embodiments, the reconfigurable system may include one or more hardware resources coupled to the programmable hardware element. Additionally, the remaining portion of the program, i.e., that portion that executes (as a simulation or emulation) on the computer system may include program instructions that access the hardware resources. In these embodiments, a test feed-through configuration may be used to provide for communication between the portion of the program executing on the computer system and the hardware resources during the debugging process.

Thus, where the program is specified to access the one or more hardware resources, prior to configuring the programmable hardware element with the first hardware configuration program, the method may include analyzing the remaining portion of the program and the one or more hardware resources. For example, the remaining portion of the program (that portion that remains to be debugged) may be analyzed to determine whether and/or how it accesses the one or more hardware resources, thus, determining or defining a boundary between the remaining portion of the program and the first portion of the program (the portion that has been deployed to the programmable hardware element).

Then, if the remaining portion of the program does not access the hardware resources, the method may proceed with configuring the programmable hardware element with the first hardware configuration program, as described above. If the remaining portion does access the one or more hardware resources, then the method may include determining a test feed-through configuration based on the above analysis, where the test feed-through configuration is deployable on the programmable hardware element to provide for communication between the remaining portion of the program and the one or more hardware resources. In other words, an emulation personality may be determined for deployment on the programmable hardware element to facilitate communication between the remaining portion of the program and the hardware resources. Said another way, the test feed-through configuration may provide an interface across the boundary between the emulation portion of the program and the hardware resources that it accesses.

In one embodiment, determining the test feed-through configuration may include determining a plurality of pre-compiled hardware configuration program components, and assembling the plurality of pre-compiled hardware configuration program components, thereby generating the test feed-through configuration. This use of pre-compiled hardware configuration program components may substantially decrease the time required to perform the debug cycle in that long compile times may be substantially avoided. In another embodiment, determining the test feed-through configuration may include generating a test feed-through software program based on said analyzing, and compiling the test feed-through software program, thereby generating the test feed-through configuration.

In other embodiments, a combination of both approaches may be used. In other words, determining the test feed-through configuration may include determining a plurality of pre-compiled hardware configuration program components, and assembling the plurality of pre-compiled hardware configuration program components to generate a first portion of the test feed-through configuration; then generating a test feed-through software program based on said analyzing, and compiling the test feed-through software program to generate a second portion of the test feed-through configuration; and combining the first portion of the test feed-through configuration and the second portion of the test feed-through configuration, thereby generating the test feed-through configuration.

The determined test feed-through configuration may then be included in the first hardware configuration program, and the first hardware configuration program may be deployed to the programmable hardware element, as described above. Thus, configuring the programmable hardware element with the first hardware configuration program also includes configuring the programmable hardware element with the test feed-through configuration.

Once the programmable hardware element has been configured with the first hardware configuration program, then the program may be executed, where the first portion of the program (along with the test feed-through configuration) is executed on the programmable hardware element, and the remaining portion of the program is executed on the computer system, where executing the remaining portion of the program includes the remaining portion of the program communicating with the one or more hardware resources through the programmable hardware element. For example, executing the program preferably includes invoking the one or more hardware resources to perform the function.

As indicated above, in one embodiment, user input modifying the remaining portion of the program to debug the remaining portion of the program may be received, and the method may be repeated as needed or desired. In other words, the steps described above, including those related to the test feed-through configuration, may be repeated one or more times, where generally in each iteration the first portion of the program is a successively larger portion of the program, although, as noted above, in some iterations, the first portion of the program may be (temporarily) smaller, e.g., if previously debugged parts of the program require further debugging. In other words, the debugging process described above may be performed iteratively, where generally at each iteration the portion of the program being debugged (the remaining portion of the program) is a smaller portion of the program, but where at times, the portion of the program being debugged may increase in size, e.g., due to the user moving some of the previously debugged program portion(s) back to the remaining portion for further debugging.

Note that during the course of the iterative debugging process, it may come to pass that the parts of the remaining portion of the program that access the hardware resources may have been converted and deployed to the programmable hardware element, and thus the remaining portion of the program may no longer access the hardware resources. Thus, in one embodiment, determining the test feed-through configuration and including the test feed-through configuration in the first hardware configuration program may be performed only if the remaining portion of the program is specified to access the one or more hardware resources. In other words, if the analysis of the remaining portion of the program (and the hardware resources) above determines that the remaining portion of the program does not access the hardware resources, then no test feed-through configuration may be required, and so none may be determined.

Note also that in one embodiment, during the iterative debugging process, determining the test feed-through configuration may include modifying the test feed-through configuration based on analyzing the remaining portion of the program. Thus, the test feed-through configuration may provide the emulated portion of the program (the remaining portion) with the real world connectivity of the hardware environment.

It should be noted that the hardware resources may be monolithic, i.e., built into a circuit board or device as a permanent feature, or may be modular, e.g., included on one or more cartridges (e.g., I/O cartridges) or modules (e.g., measurement modules) that may be physically inserted or attached, and/or removed from the system. It is further noted that in various embodiments, the hardware resources may be fixed, i.e., may not be changeable at runtime, or may be dynamic, i.e., changeable at runtime. So, for example, in one embodiment, the hardware resources may be both modular and dynamic, meaning that one or more hardware cartridges, such as I/O cartridges, measurement modules, etc., may be added, removed, or exchanged during execution of the program, whereas in another embodiment, the hardware resources may be both modular and fixed, meaning that one or more hardware cartridges may be inserted or attached to the system at edit time, but must remain attached until the program has completed execution. In one embodiment, at least a subset of the one or more hardware resources includes one or more hardware cartridges. Other types of hardware resources are also contemplated, including for example, hardware devices that couple to the programmable hardware element via transmission media such as a bus or a network, via wireless means, and so forth.

Thus, the techniques described herein may be used to improve the emulation performance of some applications during the debugging process. Typical applications include some portions of logic that are relatively static and fixed, and other portions that are more likely to change during development. For example, the VI for a motion controller may contain a quadrature decoder to monitor position. This is a relatively straightforward block that is unlikely to change during the course of development. It also tends to work poorly when emulated in software due to performance reasons. Thus, a custom emulation personality that incorporates user tagged portions of the application diagram (in this case the quadrature decoder) may be deployed onto the hardware, providing a more realistic emulation of the final application, and possibly allowing additional testing not possible with the software implementation of the user logic. The other portions of the application, such as the actual PID loop, may still run in software to speed development. The user can iterate on this process and generate a new emulation personality that includes additional functionality as each portion of the design becomes stable.

It should be noted that the debugging system and method described herein is applicable to any reconfigurable system using a programmable hardware element (or any other type of functional unit, including a processor/memory unit, FPGA, or any other configurable/programmable hardware). For example, the program may be any of a measurement program which is executable to perform a measurement function, an automation program which is executable to perform an automation function, a control program which is executable to perform a control function, and a modeling or simulation program which is executable to perform a modeling or simulation function, among others.

BRIEF DESCRIPTION OF THE DRAWINGS

A better understanding of the present invention can be obtained when the following detailed description of the preferred embodiment is considered in conjunction with the following drawings, in which.

Figure 1A:
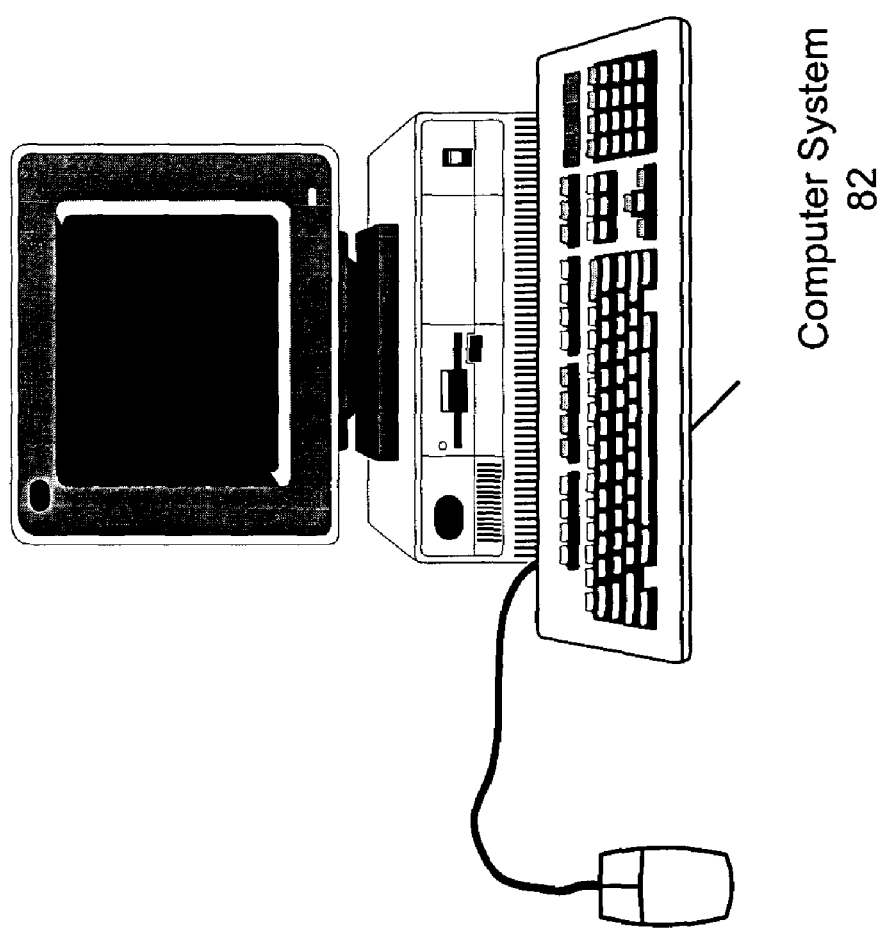
FIGS. 1A and 1B illustrate exemplary computer systems, according to one embodiment.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE EMBODIMENTS

Incorporation by Reference

The following U.S. Patents and patent applications are hereby incorporated by reference in their entirety as though fully and completely set forth herein.

U.S. patent application Ser. No. 10/055,691, now issued as U.S. Pat. No. 7,024,660, titled "System and Method for Debugging a Software Program" filed Oct. 29, 2001, whose inventors are Hugo A. Andrade, Brian Keith Odom, Cary Paul Butler, Joseph E. Peck and Newton G. Petersen.

U.S. patent application Ser. No. 10/058,150, now issued as U.S. Pat. No. 7,085,670, titled "Reconfigurable Measurement System Utilizing a Programmable Hardware Element and Fixed Hardware Resources" filed Oct. 29, 2001, whose inventors are Brian Keith Odom, Joseph E. Peck, Hugo A. Andrade, Cary Paul Butler, James J. Truchard, Newton Petersen and Matthew Novacek.

U.S. patent application Ser. No. 09/229,695, now issued as U.S. Pat. No. 6,311,149, titled "Reconfigurable Test System" filed on Jan. 13, 1999, whose inventors are Arthur Ryan, Hugo Andrade, and Brian Keith Odom, which is now U.S. Pat. No. 6,322,249.

U.S. Provisional Patent Application Ser. No. 60/312,254 titled "Measurement System with Modular Measurement Modules That Convey Interface Information" filed on Aug. 14, 2001, whose inventors are Perry Steger, Garritt Foote, David Potter, and James J. Truchard.

U.S. patent application Ser. No. 10/195,051 titled "Measurement System with Modular Measurement Modules That Convey Interface Information" filed on Jul. 12, 2002, whose inventors are Perry Steger, Garritt Foote, David Potter, and James J. Truchard.

U.S. Provisional Patent Application Ser. No. 60/312,242 titled "System and Method for Graphically Creating, Deploying and Executing Programs in a Distributed System" filed on Aug. 14, 2001, whose inventors are Jeffrey L. Kodosky, Darshan Shah, and Steven W. Rogers.

U.S. Provisional Patent Application Ser. No. 60/312,359 titled "System and Method for Online Configuration of a Measurement System" filed on Aug. 15, 2001, whose inventors are Brian Sierer, Ganesh Ranganathan, Joseph Peck and Hugo Andrade.

U.S. patent application Ser. No. 10/120,257, now issued as U.S. Pat. No. 7,013,232, titled "Network-based System for Configuring a Measurement System using Configuration Information Generated based on a User Specification" filed on Apr. 10, 2002, whose inventors are David W. Fuller III, Michael L. Santori, Brian Sierer, Ganesh Ranganathan, John Pasquarette, Joseph E. Peck, Matthew Novacek, Hugo A. Andrade, and Newton Peterson.

U.S. patent application Ser. No. 09/891,571, now issued as U.S. Pat. No. 6,784,903, titled "System and Method for Configuring an Instrument to Perform Measurement Functions Utilizing Conversion of Graphical Programs into Hardware Implementations" filed on Jun. 25, 2001, whose inventors are Jeffrey L. Kodosky, Hugo Andrade, Brian Keith Odom, Cary Paul Butler, and Kevin L. Schultz.

U.S. patent application Ser. No. 09/745,023, now issued as U.S. Pat. No. 7,210,117, titled "System and Method for Programmatically Generating a Graphical Program in Response to Program Information," filed Dec. 20, 2000, whose inventors are Ram Kudukoli, Robert Dye, Paul F. Austin, Lothar Wenzel and Jeffrey L. Kodosky.

U.S. patent application Ser. No. 09/595,003 titled "System and Method for Automatically Generating a Graphical Program to Implement a Prototype", filed Jun. 13, 2000, whose inventors are Nicolas Vazquez, Jeffrey L. Kodosky, Ram Kudukoli, Kevin L. Schultz, Dinesh Nair, and Christophe Caltagirone.

U.S. patent application Ser. No. 09/886,455, now issued as U.S. Pat. No. 7,120,876, titled "System and Method for Programmatically Generating a Graphical Program in Response to User Input", filed Jun. 20, 2001, whose inventors are Jeffrey D. Washington, Ram Kudukoli, Robert E. Dye and Paul F. Austin.

U.S. Pat. No. 4,914,568 titled "Graphical System for Modeling a Process and Associated Method," which issued on Apr. 3, 1990, whose inventors are Jeffrey L. Kodosky, James J. Truchard, and John E. MacCrisken.

U.S. Pat. No. 6,138,270 titled "System, Method and Memory Medium for Detecting Differences Between Graphical Programs," which issued on Oct. 24, 2000, and whose inventor is Ray Hsu.

U.S. Pat. No. 6,219,628 titled "System and Method for Converting Graphical Programs Into Hardware Implementations", which issued on Apr. 17, 2001, whose inventors are Jeffrey L. Kodosky, Hugo Andrade, Brian Keith Odom and Cary Paul Butler.

U.S. Pat. No. 6,173,438 titled "Embedded Graphical Programming System" filed Aug. 18, 1997, whose inventors are Jeffrey L. Kodosky, Darshan Shah, Samson DeKey, and Steve Rogers.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument (VI) using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Fixed Hardware Resources—hardware resources that have pre-defined functionality and that are not addable, removable, or exchangeable at runtime. Fixed hardware resources may have some programmable parameters. Examples of fixed hardware include physical I/O resources such as analog to digital converters (ADCs), digital to analog converters (DACs), and digital lines, among others. For example, in the case of an analog input comprising an ADC and a programmable gain stage, the gain parameter of the gain stage may be adjustable or configurable programmatically by the FPGA.

Dynamic Hardware Resources—hardware resources that may be removed from, included in, or attached to a device at runtime, i.e., during execution of the program. In other words, the hardware resources may be "hot-swappable".

Modular Hardware Resources—hardware resources that may be selected and physically removed from, included in, or attached to a device, e.g., in the field, such as I/O cartridges or measurement modules.

Data Processing and/or Analysis—the processing of data to extract useful information from the data (such as an image) or determine characteristics of the data (or to determine characteristics of one or more objects represented by the data). The term "data processing function" may also include an operation or decision that is performed in response to the information extracted or characteristics determined from the data, i.e., a control function. The term "data processing function" is also intended to include a data processing (or control) algorithm that combines a sequence of two or more data processing functions or tools and/or decision operations that process a data in a desired way or which implement a data processing, control, or machine vision application, such as part inspection, automated assembly, data analysis, pattern matching, edge detection, alarm, logging, etc.

Measurement Function—includes measurement and/or control functions, such as acquiring data, conditioning data, logging data, displaying data, analyzing and/or processing received data to generate a result, performing signal processing on received data, or otherwise analyzing and/or processing received data to perform a measurement. More specifically, a measurement function may include one or more of signal acquisition, signal conditioning, signal conversion, and measurement analysis. Examples of measurement functions include various instrumentation functions or control functions, including machine vision, image processing and motion control, among others.

Machine Vision or Image Processing Function—Includes tools such as edge detection, blob analysis, pattern matching, filtering, pixel transformations, and other image processing functions. The term "image processing" is used herein to refer to both "image processing" and "machine vision", to the extent these terms have different meanings.

Modeling or Simulation Function—Includes any type of function related to modeling or simulating a device, process, or system, including, for example, software simulations, "hardware in the loop" systems, hardware based emulation, and so forth.

RIO Overview

A Reconfigurable Input/Output (RIO) architecture may be considered a template or pattern/platform for a reconfigurable system, such as a measurement (including data acquisition), control (including automation) and/or modeling or simulation system, in which software and hardware components, as well as configuration and runtime behaviors, are defined. As used herein, the term "reconfigurable I/O" or "RIO" refers to a device, (e.g., a card) which includes at least one programmable hardware element. In simple terms, a RIO card or unit contains at least one programmable hardware element, i.e., a reconfigurable core, such as a field programmable gate array (FPGA). In some embodiment, the programmable hardware element may be coupled to or surrounded by modular and/or fixed hardware resources (e.g., I/O resources) (both on-board and off-board, e.g. measurement modules, I/O cartridges, etc.). The behavior of the reconfigurable core can be configured to better match the requirements of the measurement and/or control system. In an exemplary embodiment, the system may be implemented as an FPGA that is targeted by a development system, such as National Instruments LabVIEW or LabVIEW FPGA. Other embodiments are also contemplated, e.g., an embodiment which includes an addition of a microprocessor to the FPGA core.

Thus, the reconfigurable core (programmable hardware element) is the basis for RIO. This scaleable resource may include such functions as I/O interfacing, timing and triggering, inline processing, and embedded decision-making. In some embodiments, one or more hardware resources may be coupled to the reconfigurable core, and may typically provide one of four types of functionality:

1) a control and data path to a host computer;
2) an I/O interface to external systems;
3) optimized hardware elements; and
4) basic operating services.

These resources by themselves may not define the measurement and/or control (or simulation) system, but rather may provide the low-level building blocks for creation of the system. The configuration or program (the hardware configuration program) in the reconfigurable core (e.g., the FPGA) may then build on these blocks to define the system. It should be noted, however, that the inclusion of the one or more hardware resources in the system is optional, and that in some applications, the hardware resources may not be required, and so may be omitted. It should also be noted that the hardware resources may be monolithic, i.e., built into a circuit board or device as a permanent feature, or may be modular, e.g., included on one or more cartridges or modules that may be physically inserted or attached, and/or removed from the system. It is further noted that in various embodiments, the hardware resources may be fixed, i.e., may not be changeable at runtime, or may be dynamic, i.e., changeable at runtime. So, for example, in one embodiment, the hardware resources may be both modular and dynamic, meaning that one or more hardware cartridges, such as I/O cartridges, measurement modules, etc., may be added, removed, or exchanged during execution of the program, whereas in another embodiment, the hardware resources may be both modular and fixed, meaning that one or more hardware cartridges may be inserted or attached to the system at edit time, but must remain attached until the program has completed execution. Further discussion of fixed and dynamic hardware resources is provided below.

A RIO device as described herein may be capable of being configured or programmed (in hardware) to perform any of a variety of measurement, control, and/or simulation tasks, i.e., to assume the properties in hardware of various devices or configurations of devices, as well as measurement and/or control functions. A RIO device may be used to perform any of various types of hardware operations in any of various applications. Exemplary applications targeted by RIO include, but are not limited to, measurement and data acquisition, embedded I/O and machine control, high-speed analog control loops, high density discrete control, modeling, hardware in the loop simulation, and applications requiring custom hardware triggering and/or digital logic, among others. In general, RIO may be particularly suitable for developing simple hardware functionality which is difficult to express in modular (and optionally dynamic or fixed as well) hardware resources, including complex triggering, quadrature encoding, simple bit transfers, and the like, as well as hardware based interlocks, simple control algorithms, e.g., PID (proportional integral derivative), and simple measurements, DSP, rise time, fall time, RMS (root mean square), FIR (finite impulse response) filters, and period measurement, among others, although it is noted that RIO may be used for any other hardware development as well.

For further information regarding reconfigurable I/O and test systems please see U.S. patent application Ser. No. 10/055,691, titled "System and Method for Debugging a Software Program" filed Oct. 29, 2001, U.S. patent application Ser. No. 10/058,150, titled "Reconfigurable Measurement System Utilizing a Programmable Hardware Element and Fixed Hardware Resources" filed Oct. 29, 2001, and U.S. patent application Ser. No. 09/229,695 titled "Reconfigurable Test System" filed on Jan. 13, 1999, whose inventors are Arthur Ryan, Hugo Andrade, and Brian Keith Odom, which is now U.S. Pat. No. 6,322,249, all of which were incorporated by reference above.

It should be noted that the RIO system described above is but one example of a reconfigurable system, i.e., a system using a programmable hardware element, and that various embodiments of the present invention are contemplated for use in any type of system that uses one or more programmable hardware elements, such as FPGAs. It should also be noted that although in a preferred embodiment, the program may comprise a graphical program, i.e., the program may comprise a plurality of interconnected nodes which visually indicate functionality of the graphical program, such as a LabVIEW VI (Virtual Instrument), in other embodiments, the user may create a program in a text-based programming language such as C, C++, Java, VisualBasic, Pascal, Fortran, etc. Thus, although in the descriptions that follow, the program is generally described as a graphical program, any other types of program are also contemplated for use by or with the present invention.

Fixed and Dynamic Resources

A fixed resource is one that does not change during run time. For example, I/O resources on a PXI-7831R (a plug in, mechanically monolithic board) are considered fixed resources. Fixed hardware resources may include ADCs, DACs, digital lines, and other components that cannot be added or removed during execution. Other examples of fixed hardware resources are cartridges in a CompactRIO system (as provided by National Instruments Corporation) where the cartridges (although mechanically modular) may be selected and installed at edit time, but may not be added or removed during execution or development.

A dynamic resource can be modified, added, removed, or exchanged at run time, e.g., a measurement module, or a cartridge from a CompactRIO chassis may be removed and replaced with a different module or cartridge during execution. The replaced cartridge may be the same, similar, or a completely different type of cartridge.

FIG. 1A—Computer System

FIG. 1A illustrates a computer system 82 operable to execute program instructions for facilitating debugging of a program intended for deployment and execution on a programmable hardware element, e.g., as part of a reconfigurable system.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
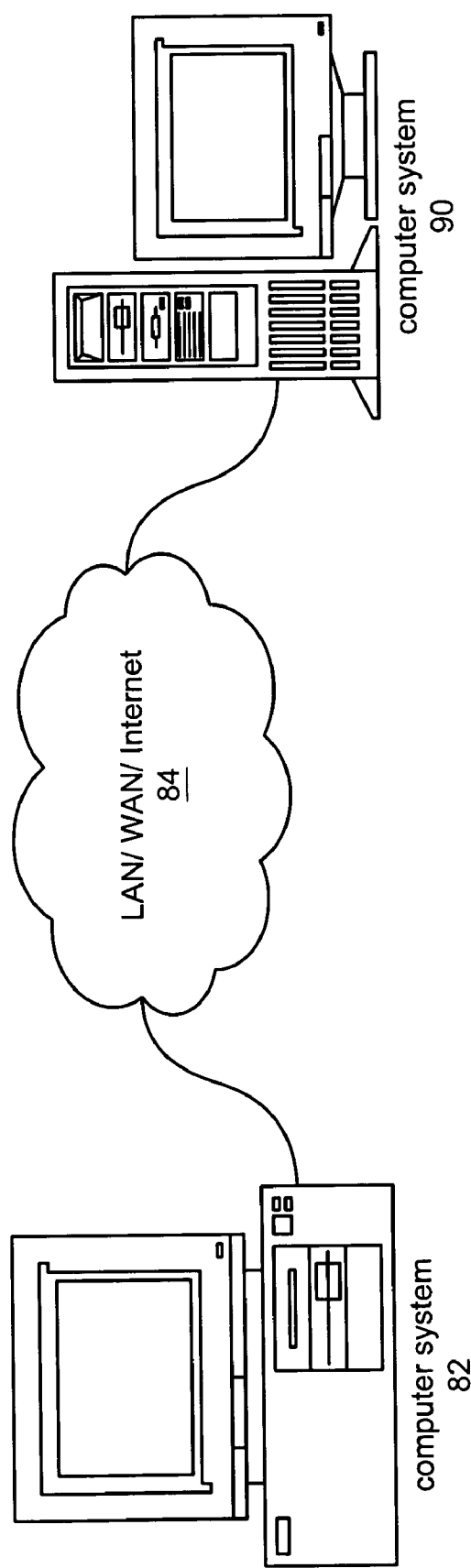

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
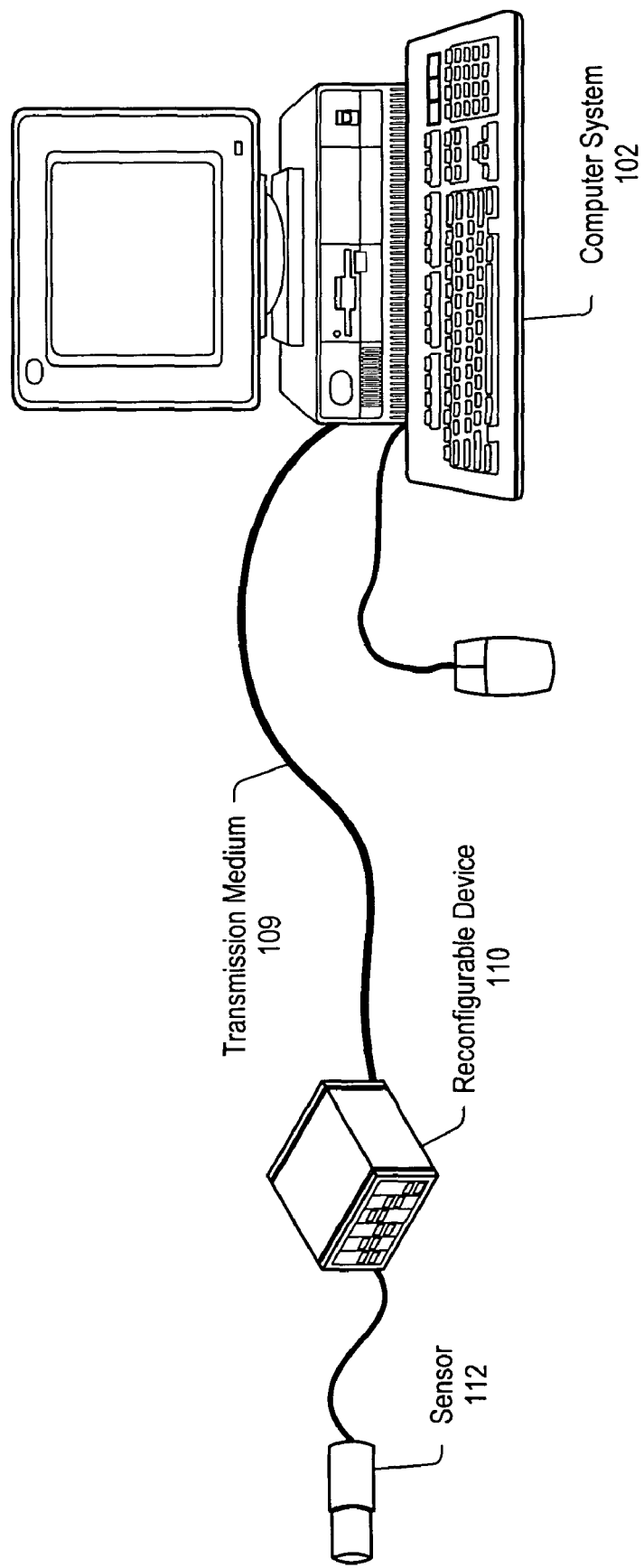
FIG. 2A illustrates a reconfigurable system, according to one embodiment of the present invention.

FIG. 2A—System with a Reconfigurable Device

FIG. 2A illustrates one embodiment of a system that includes a reconfigurable device 110, referred to herein as a "device" 110. As FIG. 2A shows, in this embodiment, a reconfigurable device 110 is coupled to an external hardware resource, specifically, sensor 112, as well as computer system 82.

The host computer 82 may comprise a CPU, a display screen, memory, and one or more input devices such as a mouse or keyboard as shown. The computer 82 may be used to configure or program the device 110, as described below. Additionally, as noted above, the computer 82 may optionally operate with the device 110, e.g., to analyze or measure data and/or to control the device 110.

In one embodiment, the computer system 82 may store an application development environment (ADE) for creating programs. The ADE may include specific functionality for creating programs that are to be deployed on the device 110. The ADE may also include specific functionality for a certain type of application, such as measurement, control, automation, and/or simulation, among others. With respect to the ADE for creating the program to be deployed onto the device 110, input to the ADE may be textual, graphical, a hardware description language, may be through a configuration environment (e.g., a wizard) or an API structural description. In one embodiment, the memory medium may store a graphical programming development system for developing graphical programs.

The computer system also preferably stores program instructions, i.e., a program or programs, for debugging software programs, such as graphical programs. For example, in one embodiment, the debugging programs may be included in the ADE.

The computer system may also store an application program implementing a function. For example, the computer system may store an application program implementing one or more measurement or control functions, i.e., a measurement or control program, e.g., a program, such as a graphical program, implementing the one or more measurement or control functions. Of course, the application program may perform other specified functionality besides or in addition to measurement and control as desired, as was mentioned above (e.g., modeling or simulation). The application function is preferably intended for execution by the reconfigurable device 110. More specifically, the application function is intended for deployment to and execution on the programmable hardware element 106 on the device 110.

The computer system 82 may also store a deployment program which is executable to generate a hardware configuration program based on a program generated by the ADE, e.g., based on the application program. The deployment program may be part of the ADE. The deployment program may also be executable to transfer or deploy the hardware configuration program onto the programmable hardware element (or multiple programmable hardware elements) of the device 110. Deployment may be performed by converting at least a portion of a program into a form for configuring or programming a programmable hardware element. In alternate embodiments, deployment may be performed by transferring the program to execute natively on a processor, or by converting the program to a different form and transferring the converted program for execution by a processor and memory. The device 110 may be controlled by or configured by programs which are deployed or downloaded to the programmable hardware element on the device 110. In various embodiments, the program deployed on the device 110 may be any of various types, such as programs created in graphical languages, text-based programming languages, or hardware description languages, etc.

In one embodiment the graphical program may be deployed by either one or more of: 1) converting the graphical program (or a portion thereof) into a hardware implementation (hardware configuration program) and configuring the programmable hardware element with this hardware implementation, 2) transferring a first portion of the graphical program (or a portion thereof) to a memory for execution by a processor (where the memory and processor are on the device 110 or the computer system 82), wherein the processor may execute a graphical program execution engine and optionally a real time operating system), and deploying a second portion of the graphical program as a hardware configuration program on a programmable hardware element (e.g., a device with mixed LabVIEW RT (Real Time) and LabVIEW FPGA execution); or 3) compiling a first portion of the graphical program (or a portion thereof) into an executable program and transferring the executable program to a memory for execution by a processor (where the memory and processor are on the device 110 or the computer system 82), (where the processor may optionally execute a real time operating system), and deploying a second portion of the graphical program as a hardware configuration program on a programmable hardware element.

As noted above, the device 110 preferably includes a programmable hardware element 106, such as a field programmable gate array (FPGA). Thus, in the preferred embodiment, the device 110 includes at least one programmable hardware element 106, which may be programmed by computer system 82. In one embodiment, the device 110 may include a plurality of programmable hardware elements 106. The computer system 82 may also couple to multiple reconfigurable devices 110, where each device 110 includes one or more programmable hardware elements 106. For example, the computer system 82 may couple to multiple reconfigurable devices 110, wherein the devices 110 may be distributed in various locations on a network (such as the Internet).

Where the device 110 includes a plurality of programmable hardware elements 106, the computer system 82 may be operable to transfer or deploy a hardware configuration program onto one or more (or all) of the plurality of programmable hardware elements of the device 110. Thus the hardware configuration program may be generated and/or deployed in a manner to distribute the hardware configuration program across multiple programmable hardware elements 106. The hardware configuration program may also be generated and/or deployed in a manner to distribute the hardware configuration program across multiple devices 110, wherein each device may include one or more programmable hardware elements 106.

In the embodiment shown, the computer system 82 may be included in the system only for development and/or debugging purposes, as described in detail below, or alternatively, may also operate to store and execute program instructions in conjunction with the reconfigurable device 110 executing a program or portion of a program to perform a function. Thus, in some embodiments, the reconfigurable device 110 may operate in conjunction with the computer system 82, and in other embodiments, the reconfigurable device 110 may be a standalone device, i.e., may operate without the computer system 82.

Similarly, in one embodiment, the reconfigurable device 110 may operate in conjunction with one or more hardware resources, such as sensor 112, or other resources described below. In further embodiments, the reconfigurable device 110 may operate without additional hardware resources.

It is noted that the reconfigurable device, may couple to the computer system and/or the hardware resources via any means, including for example, a bus, such as a USB bus, or a computer network, such as a local area network (LAN) or a wide area network (WAN) such as the Internet.

Figure 2B:
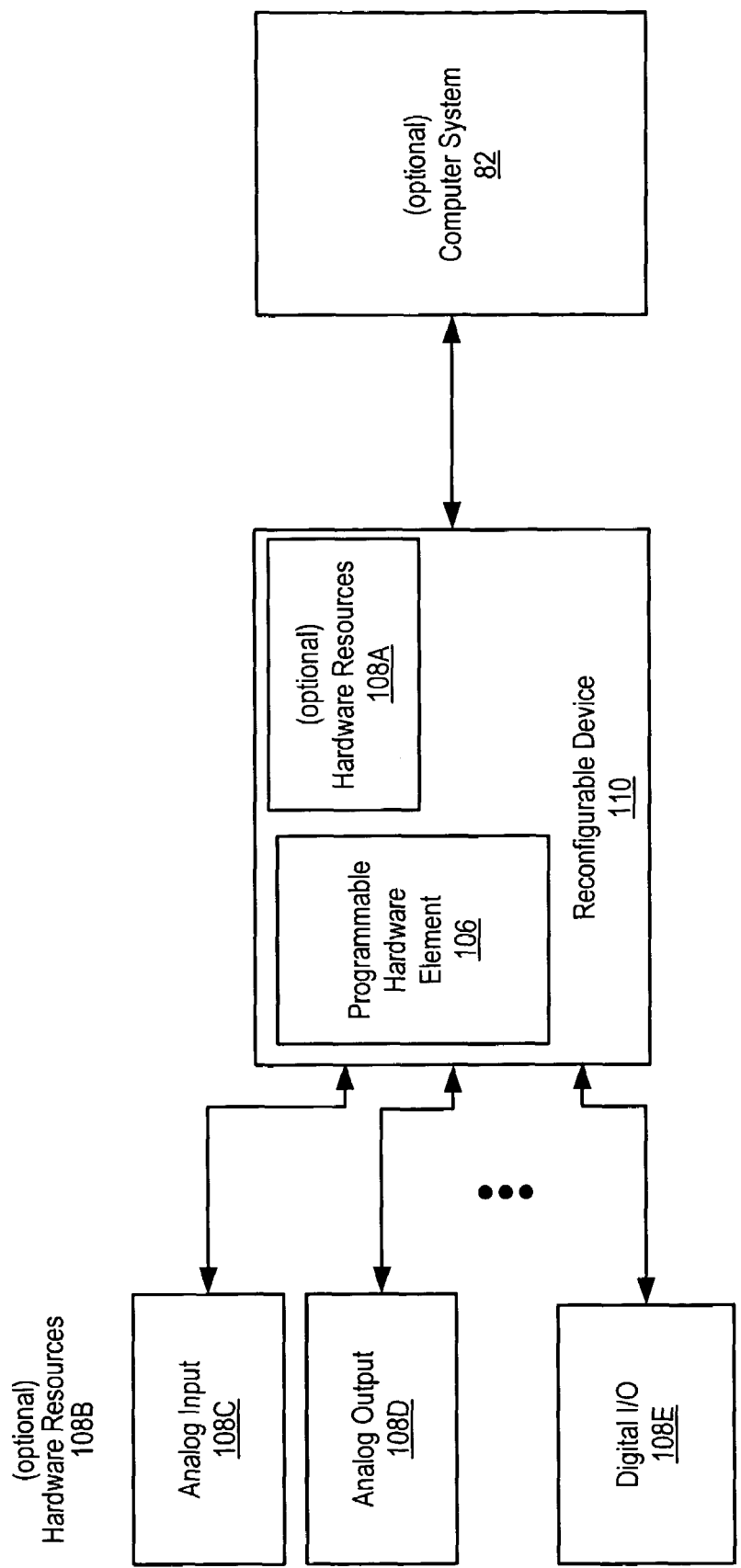
FIG. 2B is a block diagram illustrating a reconfigurable system configured with a programmable hardware element and hardware resources, according to one embodiment of the present invention.

FIG. 2B—Block Diagram of a Reconfigurable Device

FIG. 2B is a block diagram of reconfigurable device 110. As FIG. 2B shows, the reconfigurable device 110 preferably includes a programmable hardware element 106, such as an FPGA, which is configurable with a hardware configuration program to perform a specified function. For example, the hardware configuration program may be generated based on an application software program, e.g., a graphical program, and deployed to the programmable hardware element, thereby configuring the programmable hardware element to perform the specified function.

As FIG. 2B shows, and as mentioned above, in various embodiments, the reconfigurable device 110 may also include or couple to one or more hardware resources, such as, for example, signal conditioners, A/D converters, I/O cartridges, and so forth. For example, in one embodiment, the device 110 may include one or more onboard hardware resources 108A included as permanent features of the device. In other words, the hardware resources 108A may be components on a circuit board of the device 110 or may otherwise be physically attached to or in the device 110 in a substantially permanent fashion. Such substantially permanent hardware resources may be referred to as "monolithic" resources, in that they are not removable from the device.

In another embodiment, the device 110 may include or be coupled to one or more modular hardware resources 108B, e.g., I/O cartridges or measurement modules, such as an Analog Input cartridge or module 108C, an Analog Output cartridge or module 108D, and/or a Digital I/O cartridge or module 108E, among others.

As FIG. 2B also shows, and as mentioned above, the reconfigurable device 110 may optionally be coupled to computer system 82, where the computer system may be used to debug a program intended for execution on the programmable hardware element 106 to perform a specified function, and/or may operate in conjunction with the reconfigurable device by executing another program or program portion in coordination with the programmable hardware element 106 to perform the specified function.

Figure 3A:
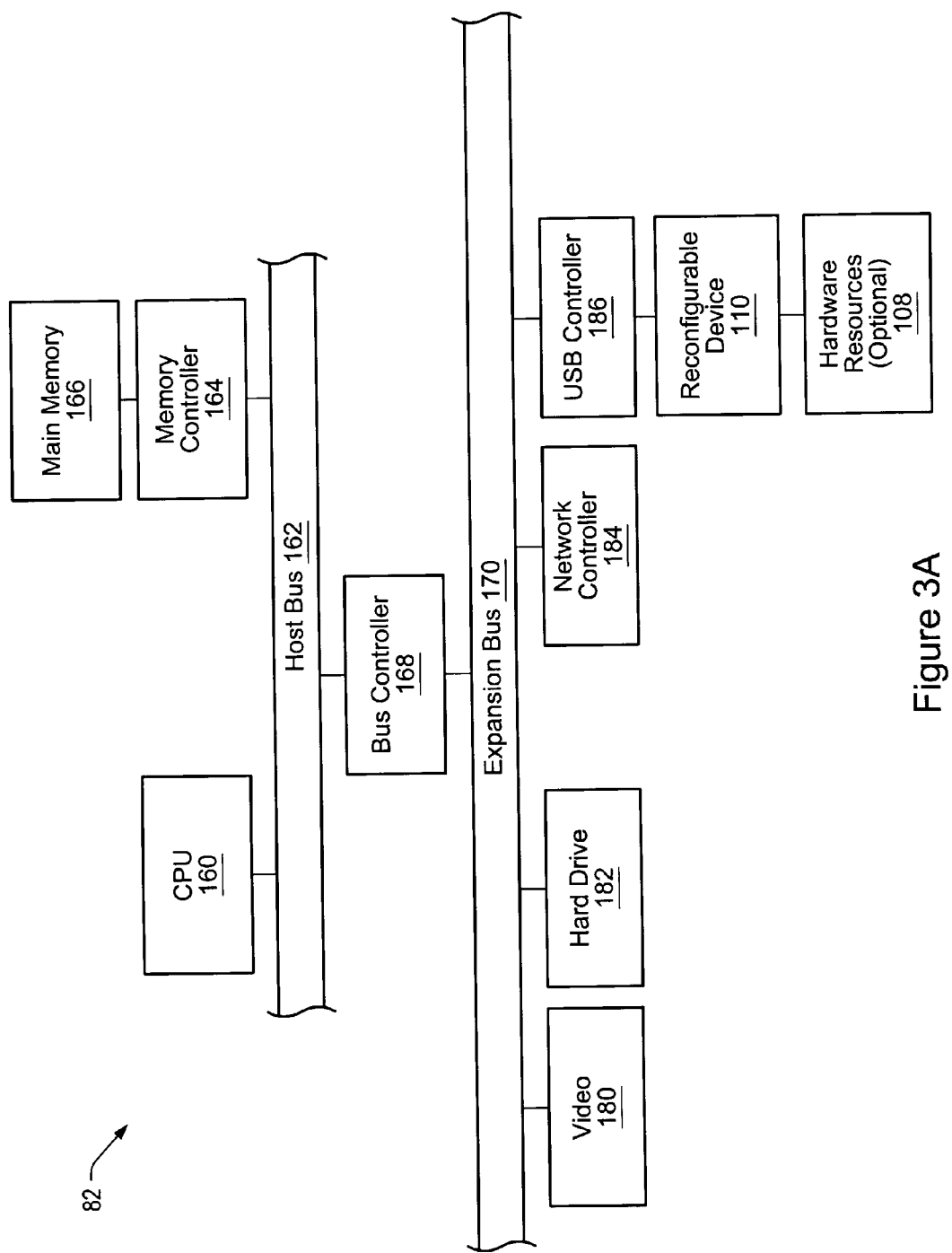
FIGS. 3A and 3B are block diagrams representative of the computer systems of FIGS. 1A, 1B, 2A and 2B, according to one embodiment.
Figure 3B:
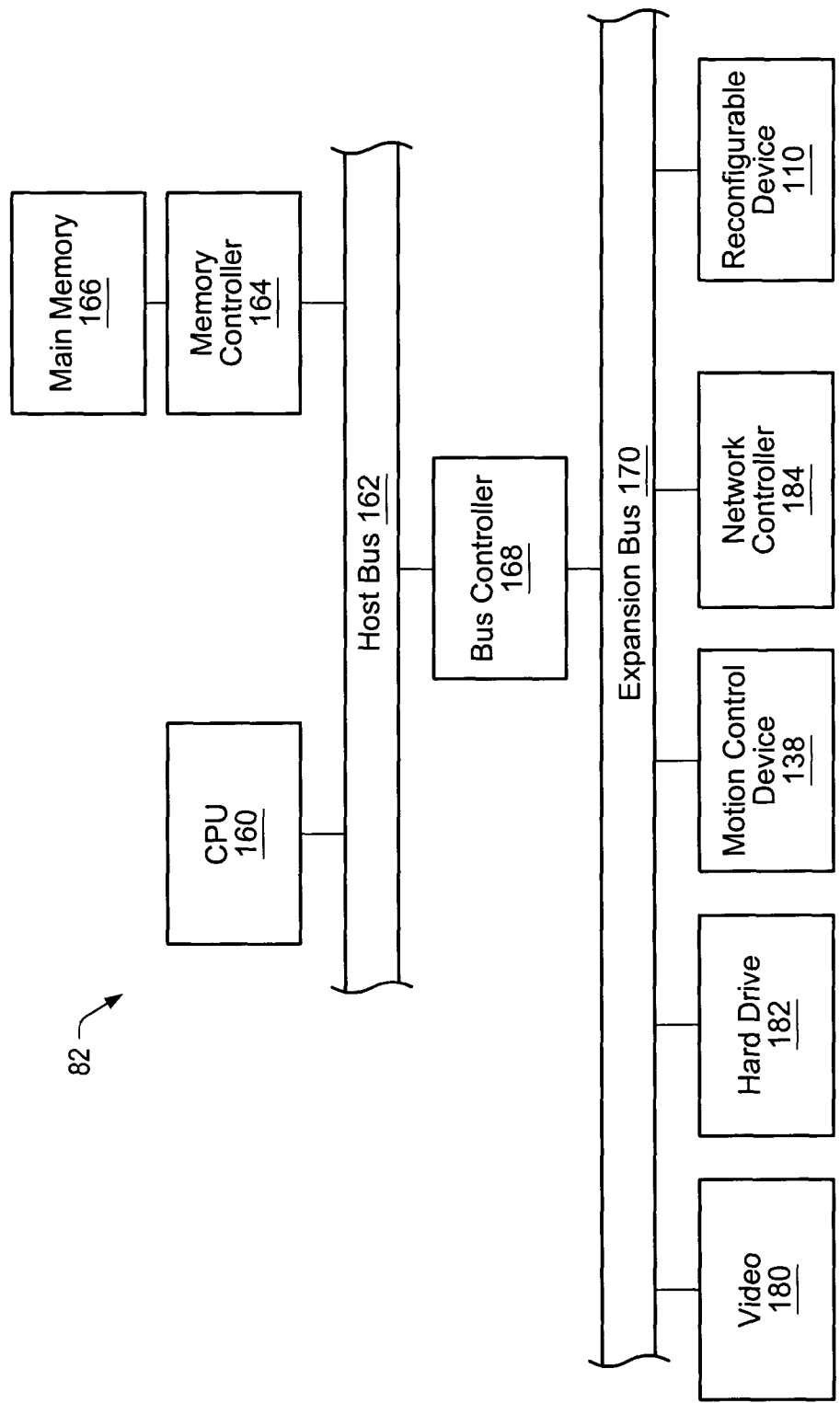

FIGS. 3A and 3B—Block Diagram of Computer System

FIGS. 3A and 3B are a block diagrams of the computer system 82 of FIGS. 1A, 1B, 2A, and 2B, according to various embodiments. The computer system 82 may be usable for debugging a program for reconfigurable device 110, according to an embodiment of the invention. As FIG. 3A shows, the reconfigurable device 110 is coupled to the computer 82. As noted above, the reconfigurable device may couple to the computer system via any means, including for example, a bus, such as a USB bus, or a computer network, such as a local area network (LAN) or a wide area network (WAN) such as the Internet.

The elements of a computer not necessary to understand the operation of the present invention have been omitted for simplicity. As FIG. 3A shows, the computer 82 may include at least one central processing unit (CPU) or processor 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164. The main memory 166 may be operable to store one or more programs according to the present invention, as described above. The main memory 166 may also store operating system software, i.e., software for operation of the computer system, as well as one or more application programs, as is well known to those skilled in the art. In addition, the main memory 166 may store one or more application programs which are executable to perform specified functions, such as measurement (including DAQ) and/or control tasks (and/or modeling or simulation tasks).

The host bus 162 is coupled to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for various devices.

In FIG. 3A, the devices coupled to the expansion bus 170 include a controller 186, e.g., a USB controller 186, here shown coupled to device 110. In this embodiment, the device 110 is coupled to optional hardware resources 108, such as, for example, a National Instruments small form-factor measurement module coupled to a sensor. In this embodiment, the devices also include network controller 184, video display subsystem 180 and hard drive 182 coupled to the expansion bus 170, also shown. It should be noted that the network controller 184 may be any type of network controller, including Ethernet, wireless Ethernet (IEEE 802.11), Bluetooth, and CAN, among others. Furthermore, the USB controller shown is meant to be illustrative only, i.e., any other type of controller may be used as desired to communicate with the device 110. In other embodiments, the controller 186 may be comprised in the bus controller 168, or may be implemented in any other forms customary and known in the art.

As noted above, the device 110 may optionally be coupled to or include one or more hardware resources 108, here shown coupled to the device 110. As also noted above, in one embodiment, the optional hardware resources may be monolithic (108A), i.e., permanent features or components of the device 110. As also mentioned above, in another embodiment, the device 110 may include one or more modular hardware resources 108B, e.g., in the form of I/O cartridges or measurement modules that may be inserted and/or removed from the device 110 by the user based on the particular application or functionality desired. Modular hardware resources 108B may also be located external to the device 110. For example, a chassis may be coupled to the device 110, where the chassis operates to receive one or more cartridges that may each provide a respective function, such as an I/O function (or any other type of function) for the device 110. A deployed hardware configuration program on the device 110 may be operable to invoke functionality of one or more of the modular hardware resources 108B. A user may specify use of modular hardware resources 108B when creating the program using the ADE. Alternatively, or in addition, the deployment program may automatically specify use of modular hardware resources.

In FIG. 3B, the examples of devices coupled to the expansion bus 170 shown include reconfigurable device 110, a network controller 184 (such as for coupling to a device 110 over a network), a motion control device 138, as well as a hard drive 182, and a video display subsystem 180. The device 110 may be implemented in any of various computer system components, such as network device 184, motion control device 138, bus controller 168, etc.

Thus, the device 110 may be reconfigurable, i.e., programmable by an external computer system, such as computer system 82. More specifically, the computer system may be operable to deploy the application program onto the programmable hardware element(s) of the device 110. In other words the computer system 82 may download the program onto the programmable hardware element of the device 110, after which the device 110 may be operable to execute the application program to perform the specified functionality, e.g., one or more measurement and/or control functions (or other specified function).

After a program has been deployed as a hardware configuration program onto the programmable hardware element of the device 110, the device may operate in a stand-alone fashion to perform the specified function. For example, the device unit may be disconnected from the computer system 82 or from the network to which it is attached, and the device 110 may be used to perform the function as a stand-alone device. Alternatively, the device 110 may optionally operate in conjunction with operation of other devices, such as the one or more hardware resources 108, and/or possibly the computer system 82, as well as other devices, such as other reconfigurable devices 110, smart sensors, networked devices, etc. The configured device 110 and the hardware resources 108 may thus be operable to perform specified (e.g., data acquisition and/or control) operations, e.g., using the sensor 112 and/or the computer system 82. More generally, a function may be distributed across multiple devices, such as one or more device units 110, one or more sensors (such as smart sensors), one or more hardware resources, e.g., I/O cartridges or measurement modules, one or more computer systems, and/or one or more instruments or other devices.

FIGS. 4A-5B—Debugging a Programmable Hardware Based System

In computer software and hardware development, debugging is the process of locating, fixing, or bypassing "bugs" (errors) in computer program code or the engineering of a hardware device. Debugging a program or hardware device may involve identifying a problem, isolating the source of the problem, and then fixing it. A user of a program that does not know how to fix the problem may learn enough about the problem to be able to avoid it until it is permanently fixed.

Debugging is a necessary process in almost any software or hardware development process, whether a commercial product or an enterprise or personal application program. For complex products, debugging may be performed for the smallest unit of a system, again at component test when parts are brought together, again at system test when the product is used with other existing products, and again during customer beta test, when users try the product out in a real world situation. Because most computer programs and many programmed hardware devices contain thousands of lines of code, almost any new product is likely to contain "bugs".

The general approach to developing a programmable hardware element based system, i.e., a reconfigurable system, is to develop a program for performing a function in a development environment, such as National Instruments LabVIEW graphical development environment, convert the program into a form suitable for loading onto the programmable hardware element 106, e.g., an FPGA program file (hardware configuration program), load the converted program onto the programmable hardware element 106, test the system by performing the function, observe the results, and iterate the above process until the performance of the function is correct and complete.

For example, National Instruments LabVIEW FPGA is a technology that creates a hardware implementation of a diagram created using the LabVIEW development environment. This allows the user to create a program, i.e., a graphical program or diagram, using the standard LabVIEW primitives for algorithms, looping, timing, triggering, etc., coupled with new I/O primitives to define the behavior of the target hardware. The typical approach used by LabVIEW users is to iterate on the design using a fast failure approach: Implement a basic design and try it. If it doesn't work make a small change and try it again. Continue with this process until the desired results are achieved.

The difficulty with this approach when targeting hardware is due to compile times. Typical compile times for creating software in LabVIEW are measured in seconds, or milliseconds, whereas typical compile times for programming hardware in LabVIEW range from minutes to hours. Thus, it is not efficient or feasible for many users to make a small change and wait hours to see the results. The system presented below is a mechanism to provide the compile time advantage of a software target for portions of the program during the debugging process. It is noted that although the system and method are described primarily in terms of a measurement system, the approach is broadly applicable to any system which uses a programmable hardware element, optionally in conjunction with one or more modular hardware resources, including, but not limited to measurement (including data and image acquisition), control (including automation), and modeling or simulation, among others.

Figure 4A:
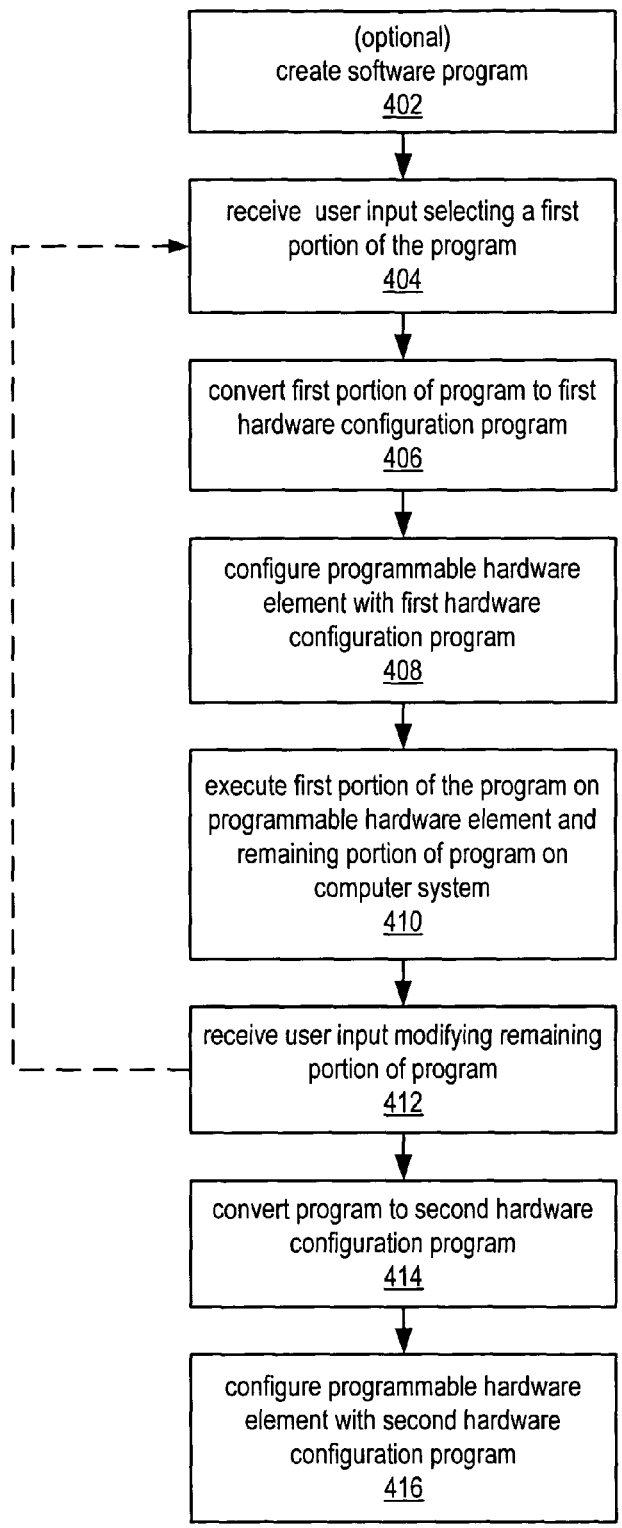
FIGS. 4A and 4B flowchart embodiments of a method for debugging a reconfigurable system.

FIG. 4A flowcharts one embodiment of a method for debugging a program intended for deployment and execution on a programmable hardware element, e.g., as part of a reconfigurable system, described above. In various embodiments, some of the steps described may be performed concurrently, in a different order than show, or omitted. Additional steps may also be performed as desired.

As FIG. 4A shows, in 402, a program may optionally be created, where the program is designed to perform a function. As noted above, the program may be any type of program, e.g., a text based program or a graphical program. In a preferred embodiment, the program is a LabVIEW graphical program, such as a LabVIEW FPGA program, developed in the LabVIEW graphical program development environment provided by National Instruments Corporation. In one embodiment, the program may be created on host computer system 82, or alternatively, the program may be created on another computer system and transferred to the host computer system 82.

Creation of a graphical program may comprise the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may assemble the user interface on the display. As one example, the user may use the LabVIEW graphical programming development environment to create the graphical program.

In an alternate embodiment, the graphical program may be created by the user creating or specifying a prototype using a prototyping environment, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, or a combination thereof, as desired. The graphical program may implement a measurement function that is desired to be performed by the instrument (or other type of function, as described above).

Figure 5A:
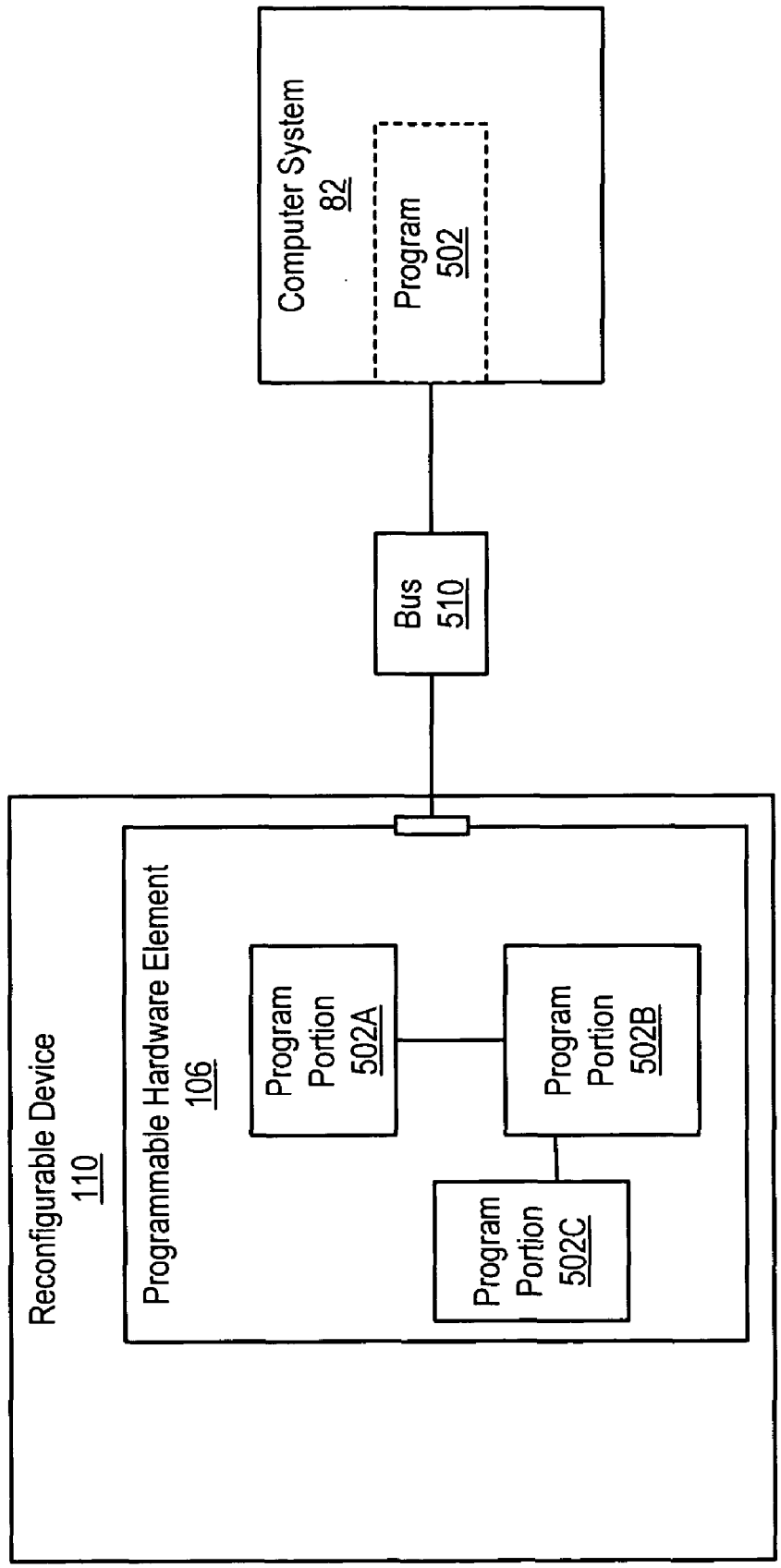
FIGS. 5A and 5B are block diagrams illustrating reconfigurable systems suitable for implementing the methods of FIGS. 4A and 4B, respectively, according to one embodiment of the invention.

In correspondence with the debugging method of FIG. 4A, FIG. 5A is a block diagram illustrating an exemplary system suitable for implementing the method of FIG. 4A. As FIG. 5A shows, in this embodiment, the host computer system 82 may include the program 502, e.g., the application program, intended for deployment and execution on the reconfigurable device 110. The computer system 82 couples to the reconfigurable device 110 via bus 510, although as noted above, other transmission media are also contemplated, such as a WAN, e.g., the Internet, wireless means, and so forth. As FIG. 5A also shows, the reconfigurable device 110 includes a programmable hardware element 106, e.g., an FPGA, as described above.

In 404, user input indicating a first portion of the program may be received. In a preferred embodiment, a graphical user interface may be presented to the user, and may receive the user input indicating the first portion of the program. For example, the user may draw a graphical box around the desired first portion, e.g., using a pointing device such as a mouse, or the user may select graphical elements in the first portion, e.g., while holding down the shift or control key, or otherwise indicate the first portion.

Then, in 406, the first portion of the program may be converted into a first hardware configuration program which is deployable on the programmable hardware element to perform a corresponding first portion of the function, wherein a remaining portion of the program is to be debugged by a user. In other words, the user input from 404 above may indicate that the first portion of the program is not to be debugged, i.e., that the first portion of the program is substantially stable, i.e., comprises a substantially debugged portion of the program.

In 408, the programmable hardware element may be configured with the first hardware configuration program. In other words, the hardware configuration program may be deployed onto the programmable hardware element. Said another way, the first portion of the program may be deployed to the programmable hardware element. The configured programmable hardware element may then be operable to perform the corresponding first portion of the function.

In 410, the program may be executed. Executing the program preferably includes the programmable hardware element executing the first portion of the program, and the computer system executing the remaining portion of the program, where the remaining portion of the program is operable to be analyzed and debugged in response to said executing. The computer system executing the remaining portion of the program may simulate (i.e., emulate) execution of the remaining portion of the program on the programmable hardware element.

In 412, user input modifying the remaining portion of the program to debug the remaining portion of the program may be received. In other words, in response to or in conjunction with executing the program, the user may analyze the program behavior and provide input indicating one or more modifications to the remaining portion of the program.

Once the program has been debugged, the program may be converted into a second hardware configuration program which is deployable on the programmable hardware element to perform the function, as indicated in 414. Note that the second hardware configuration program was generated from a substantially debugged version of the program.

Finally, in 416, the programmable hardware element may be configured with the second hardware configuration program. The reconfigurable system, including the configured programmable hardware element, may then be operable to perform the function.

As FIG. 4A also illustrates, in one embodiment, steps 404 through 412 may be repeated one or more times, where in each iteration the first portion of the program is a successively larger portion of the program. In other words, the debugging process described above may be performed iteratively, where at each iteration the portion of the program being debugged (the remaining portion of the program) is a smaller portion of the program. In this embodiment, once the remaining portion of the program has been substantially debugged, then the conversion of the program in 414 may be performed, generating the second hardware configuration program, and the generated second hardware configuration program deployed to the programmable hardware element, indicated in 416 and described above.

It should be noted, however, that in other embodiments, one or more portions of the program that have been previously debugged may require further debugging, e.g., due to changes made in other parts of the program, and so may be re-incorporated into the remaining portion of the program. Thus, in one embodiment, the debugging process described above may be repeated a plurality of times, where, in a first subset of iterations the first portion of the program is a successively larger portion of the program, and in a second subset of iterations the first portion of the program is a successively smaller portion of the program. For example, the user may move some of the (previously debugged) first portion of the program back into the remaining portion for further debugging, thereby (at least temporarily) increasing the size of the remaining portion, while decreasing the size of the first portion. Of course, over the course of the debugging process, the general trend will be for the size of the remaining portion of the program to decrease as more and more of the program is debugged.

Referring to FIG. 5A, an initial first portion of the program may be represented by program portion 502A, here shown already deployed onto the programmable hardware element 106), where as described above, the user has specified the first portion for deployment onto the programmable hardware element, and a corresponding hardware configuration program has been determined or generated, and deployed to the device 110. As FIG. 5A also indicates, in subsequent iterations of the debugging process, further portions, e.g., 502B and 502C, have been specified (preferably after being debugged), converted, and deployed to the device 110. Note that once all of the portions of the program 502 have been debugged and deployed, there is no remaining portion of the program left to debug, i.e., left on the computer system 82, indicated by the program 502 being represented by a dashed rectangle.

Thus, either in a single pass or over multiple iterations, a portion or portions of the application program 502 may be executed on the computer system as an emulation or simulation of execution of the portion or portions on the programmable hardware element 106, where the other portion or portions of the program, preferably those portions that are substantially debugged, i.e., are stable, are executed on the reconfigurable device, i.e., on the programmable hardware element.

As described above, in some embodiments, the reconfigurable system may include one or more hardware resources coupled to the programmable hardware element. Additionally, the remaining portion of the program, i.e., that portion that executes (as a simulation or emulation) on the computer system may include program instructions that access the hardware resources. In these embodiments, a test feedthrough configuration may be used to provide for communication between the portion of the program executing on the computer system and the hardware resources during the debugging process. For further details of using a test feedthrough configuration on a programmable hardware element to provide for communication between an emulation software program executing on a computer system with hardware resources, please see U.S. patent application Ser. No. 10/058,150, titled "Reconfigurable Measurement System Utilizing a Programmable Hardware Element and Fixed Hardware Resources", which was incorporated above.

Figure 4B:
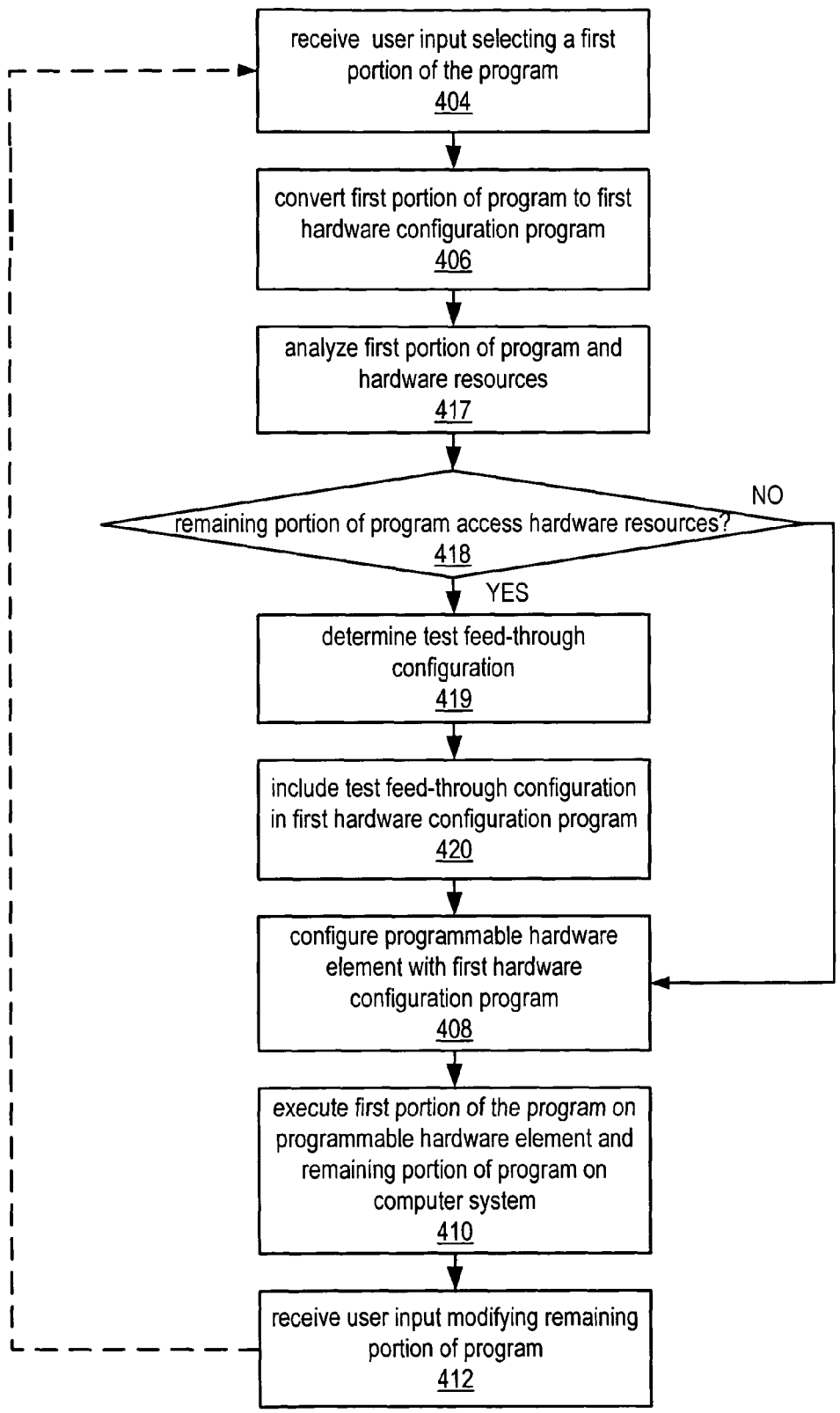

FIG. 4B flowcharts an embodiment of a portion of the method of FIG. 4A where the programmable hardware element is coupled to one or more hardware resources. Note that only the (optionally) iterated portion of the method of FIG. 4A is presented (steps 404-412), and that the prior and post steps not shown (402 and 414-416) are indicated by the ellipses at the top and bottom of FIG. 4B. As noted above, in various embodiments, some of the steps described may be performed concurrently, in a different order than show, or omitted. Additional steps may also be performed as desired. Note that where the steps of the method are substantially the same as those described above with reference to FIG. 4A, the descriptions may be abbreviated.

As shown in FIG. 4B, in 404, user input indicating the first portion of the program may be received, and in 406, the first portion of the program may be converted into a first hardware configuration program, as described above with reference to FIG. 4A.

As also shown in FIG. 4B, where the program is specified to access the one or more hardware resources, prior to configuring the programmable hardware element with the first hardware configuration program (408), the method may include analyzing the remaining portion of the program and the one or more hardware resources, as indicated in 417. For example, the remaining portion of the program (that portion that remains to be debugged) may be analyzed to determine whether and/or how it accesses the one or more hardware resources, thus, determining or defining a boundary between the remaining portion of the program and the first portion of the program (the portion that has been deployed to the programmable hardware element).

Then, in 418, if the remaining portion of the program does not access the hardware resources, the method may proceed with step 408, configuring the programmable hardware element with the first hardware configuration program, as described above.

If the remaining portion does access the one or more hardware resources, then the method may proceed to 419, where a test feed-through configuration may be determined based on the analysis of 417, and where the test feed-through configuration is deployable on the programmable hardware element to provide for communication between the remaining portion of the program and the one or more hardware resources. In other words, an emulation personality may be determined for deployment on the programmable hardware element to facilitate communication between the remaining portion of the program and the hardware resources. Said another way, the test feed-through configuration may provide an interface across the boundary between the emulation portion of the program and the hardware resources that it accesses.

In one embodiment, determining the test feed-through configuration may include determining a plurality of pre-compiled hardware configuration program components, and assembling the plurality of pre-compiled hardware configuration program components, thereby generating the test feed-through configuration. This use of pre-compiled hardware configuration program components may substantially decrease the time required to perform the debug cycle in that long compile times may be substantially avoided. In another embodiment, determining the test feed-through configuration may include generating a test feed-through software program based on said analyzing, and compiling the test feed-through software program, thereby generating the test feed-through configuration.

In other embodiments, a combination of both approaches may be used. In other words, determining the test feed-through configuration may include determining a plurality of pre-compiled hardware configuration program components, and assembling the plurality of pre-compiled hardware configuration program components to generate a first portion of the test feed-through configuration; then generating a test feed-through software program based on said analyzing, and compiling the test feed-through software program to generate a second portion of the test feed-through configuration; and combining the first portion of the test feed-through configuration and the second portion of the test feed-through configuration, thereby generating the test feed-through configuration.

The determined test feed-through configuration may then be included in the first hardware configuration program, as indicated in 420, and the first hardware configuration program may be deployed to the programmable hardware element in 408, as described above. Thus, configuring the programmable hardware element with the first hardware configuration program also configuring the programmable hardware element with the test feed-through configuration.

Once the programmable hardware element has been configured with the first hardware configuration program, then in 410, the program may be executed, where the first portion of the program (along with the test feed-through configuration) is executed on the programmable hardware element, and the remaining portion of the program is executed on the computer system, where executing the remaining portion of the program includes the remaining portion of the program communicating with the one or more hardware resources through the programmable hardware element. For example, executing the program preferably includes invoking the one or more hardware resources to perform the function.

As indicated in 412, and described above with reference to FIG. 4A, in one embodiment, user input may be received modifying the remaining portion of the program for debugging, and the method may be repeated as needed or desired. In other words, steps 404 through 412 (including steps 417-420) may be repeated one or more times, where generally in each iteration the first portion of the program is a successively larger portion of the program, although, as noted above, in some iterations, the first portion of the program may be (temporarily) smaller, e.g., if previously debugged parts of the program require further debugging. In other words, the debugging process described above may be performed iteratively, where generally at each iteration the portion of the program being debugged (the remaining portion of the program) is a smaller portion of the program, but where at times, the portion of the program being debugged may increase in size, e.g., due to the user moving some of the previously debugged program portion(s) back to the remaining portion for further debugging.

Note that during the course of the iterative debugging process, it may come to pass that the parts of the remaining portion of the program that access the hardware resources may have been converted and deployed to the programmable hardware element, and thus the remaining portion of the program may no longer access the hardware resources. Thus, in one embodiment, determining the test feed-through configuration and including the test feed-through configuration in the first hardware configuration program may be performed only if the remaining portion of the program is specified to access the one or more hardware resources. In other words, if the analysis of 417 above determines that the remaining portion of the program does not access the hardware resources, then no test feed-through configuration may be required, and so none may be determined.

Note also that in one embodiment, during the iterative debugging process, determining the test feed-through configuration may include modifying the test feed-through configuration based on analyzing the remaining portion of the program. Thus, the test feed-through configuration may provide the emulated portion of the program (the remaining portion) with the real world connectivity of the hardware environment.

In one embodiment, the method may also include determining the one or more hardware resources. For example, the one or more hardware resources may be determined prior to or as part of the analysis of 417. Determining the one or more hardware resources may be performed in a number of ways. For example, in one embodiment, determining the one or more hardware resources may include receiving user input indicating the one or more hardware resources, e.g., via a graphical user interface. In another embodiment, determining the one or more hardware resources may include querying the one or more hardware resources. For example, software instructions executing on the host computer system may query the reconfigurable system, e.g., the hardware resources, to identify the resources.

In one embodiment, the test feed-through configuration may be stored on the computer system, where the stored test feed-through configuration is retrievable for use in other reconfigurable systems using the one or more hardware resources. In other words, the determined test feed-through configuration may be stored as a pre-compiled hardware configuration program for subsequent use in debugging other similar reconfigurable systems. Note that during the iterative debugging process, numerous versions of the test feed-through configuration may be determined or generated, and so in some embodiments, multiple test feed-through configurations may be stored for subsequent use. It should be noted that when discussing other reconfigurable systems that use the one or more hardware resources, it is not intended that the one or more hardware resources refer to the exact same devices, but rather to devices of the same type.

Figure 5B:
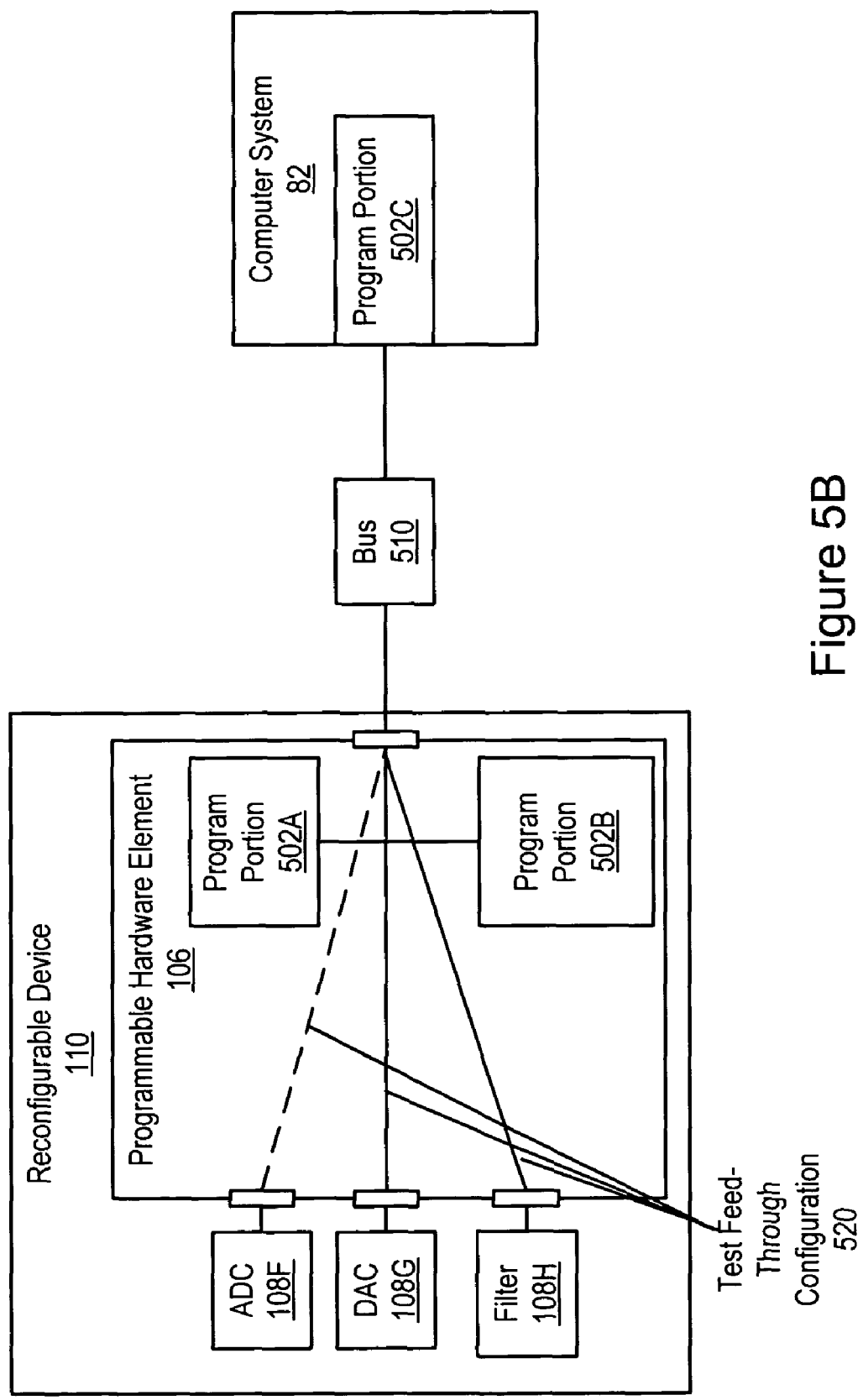

In correspondence with the debugging method of FIG. 4B, FIG. 5B is a block diagram illustrating an exemplary system suitable for implementing the method of FIG. 4B, where the reconfigurable device includes hardware resources. As FIG. 5B shows, in this example, the hardware resources include an ADC (analog to digital converter) 108F, a DAC (digital to analog converter) 108G, and a filter 108H. In the example shown, program portions 502A and 502B have been deployed onto the programmable hardware element, and thus, the remaining portion of the program (still residing on the computer system 82) is program portion 502C.

As described above, to facilitate communication between the remaining portion of the program, i.e., program portion 502C, a test feed-through configuration 520 may be deployed onto the programmable hardware element, as shown. Note that in the embodiment of FIG. 5B, program portion 502C accesses hardware resources 108G (DAC) and 108H (filter), and so the part of the (previous) test feed-through configuration corresponding to hardware resource 108F (ADC), presumably accessed by one or both of program portions 502A and 502B, is not required, and is thus no longer a part of the current test feed-through configuration, so indicated by the dashed line. As described above, once program portion 502C has been substantially debugged, the test feed-through configuration 520 may not be included in the hardware configuration program (i.e., the second hardware configuration program mentioned above), and so may not be deployed onto the programmable hardware element. It should be noted that the configuration denoted by the connections in the FPGA 106 are illustrative only, and is not meant to be an actual configuration.

As noted above, the one or more hardware resources may be monolithic or modular, and also may be fixed or dynamic. In one embodiment, at least a subset of the one or more hardware resources includes one or more hardware cartridges. In one embodiment, at least one of the one or more hardware cartridges comprises an I/O cartridge, e.g., a measurement module. Other types of hardware resources are also contemplated, including for example, hardware devices that couple to the programmable hardware element via transmission media such as a bus or a network, via wireless means, and so forth.

In one embodiment, there may be two main components for providing communication between the software emulation and the hardware resources. The first is the test feed-through configuration described above, e.g., preferably pre-compiled for the hardware target, and providing low level access to the hardware resources on the reconfigurable device 110 (e.g., reconfigurable board). In other words, when deployed on the programmable hardware element, the test feed-through configuration provides for communication between the program and the hardware resources on the reconfigurable board. The second component may be a set of I/O primitives, such as a set of standard LabVIEW I/O primitives, for the hardware resources. When targeting the hardware these I/O primitives and the standard LabVIEW primitives may be converted into a hardware representation, such as an FPGA program file (hardware configuration program), as described in U.S. patent application Ser. No. 10/058,150, titled "Reconfigurable Measurement System Utilizing a Programmable Hardware Element and Fixed Hardware Resources", which was incorporated above, and may take considerable time to compile. When targeting the test or simulation environment, also referred to as the Ghost environment, the standard LabVIEW primitives may remain in software and run on the host computer, and thus compile very quickly. The I/O primitives may also remain in software, but redirect their functionality to the precompiled test feed-through configuration in hardware.

During execution in software, the I/O primitives may communicate through the FPGA 106 to the various hardware resources 108. Thus the hardware resources 108 are actually invoked and used during the simulation. As an example, assume a first portion of a function is executed directly on an FPGA 106, and a second portion of the function is implemented by hardware resources 108 under control of the FPGA 106. The simulation method described herein executes the first portion in software on the host computer system 82, and the software invokes the hardware resources 108 to implement the second portion of the function. Thus the hardware resources 108 are invoked just as if they were being invoked directly by the FPGA 106.

For example, consider a typical PID loop using an analog input and an analog output. This is commonly constructed as a while loop containing an I/O primitive for reading the analog input, the PID algorithm itself, and an I/O primitive for writing the analog output. When targeting hardware, all of these constructs may be converted to hardware and downloaded to the reconfigurable device 110. When targeting the "Ghost" (simulation) environment, the precompiled test feed-through configuration may be quickly downloaded to the board, and the while loop and PID algorithm may remain in software. As the diagram or program executes in software on the host, whenever an I/O primitive is called it communicates with the reconfigurable device 110 to interface to the actual hardware I/O.

A key advantage to this solution is that software based debugging methodologies may be used for debugging the diagram (program) while retaining connectivity to real world signals that the hardware targeted application would provide. This functionality may be provided without any changes to the user's application and may be completely transparent. Therefore, the user may debug most functional issues related to the application or system, and so may concentrate primarily on timing issues after performing a full compilation.

In one embodiment, the test feed-through configuration may be extended to utilize a micro-controller implemented or configured in the FPGA 106. In other words, a processor (e.g., a micro-controller) may be implemented on the FPGA 106, then the program may be compiled for the FPGA-implemented processor. Compilation for the FPGA-implemented processor is similar to compilation for software executing on the host computer. The program may then be executed on the FPGA-implemented processor (while maintaining the original I/O capabilities of ghost), and so any timing issues arising from sharing the processor of the host computer system may be avoided.

Thus, the techniques described herein may be used to improve the emulation performance of some applications during the debugging process. Typical applications include some portions of logic that are relatively static and fixed, and other portions that are more likely to change during development. For example, the VI for a motion controller may contain a quadrature decoder to monitor position. This is a relatively straightforward block that is unlikely to change during the course of development. It also tends to work poorly when emulated in software due to performance reasons. Thus, a custom emulation personality that incorporates user tagged portions of the application diagram (in this case the quadrature decoder) may be deployed onto the hardware, providing a more realistic emulation of the final application, and possibly allowing additional testing not possible with the software implementation of the user logic. The other portions of the application, such as the actual PID loop, may still run in software to speed development. The user can iterate on this process and generate a new emulation personality that includes additional functionality as each portion of the design becomes stable.

It should be noted that the debugging system and method described herein is applicable to any reconfigurable system using a programmable hardware element (or any other type of functional unit, including a processor/memory unit, FPGA, or any other configurable/programmable hardware). For example, the program may be any of a measurement program which is executable to perform a measurement function, an automation program which is executable to perform an automation function, a control program which is executable to perform a control function, and a modeling or simulation program which is executable to perform a modeling or simulation function, among others.

Simulation Environment

Simulation environments are useful to figure out how a system will respond in certain situations before implementing them. This is particularly important in hardware configuration development environments, e.g., LabVIEW FPGA, because the compile times are typically very long. Note that the example elements or components described below are meant to be exemplary only, and are not intended to limit the configuration of the programmable hardware element to any particular set of components or functionality. Note that the elements and components described below are typically included in or in addition to the application program.

System Level Simulation

If the user develops a hardware application for incorporation into a larger system, as mentioned above, it may be desirable to simulate the entire system before compiling the hardware application. If everything is written in a graphical programming language such as LabVIEW this may not be difficult. All API VIs just need to have special simulation logic that gets executed when in simulation mode. For front panel register access, the simulation target can just use VI server calls to set/get values from the front panel. For DMA, the API VIs can use LabVIEW Queues. For Interrupts, the API VIs can use LabVIEW occurrences.

Low Level Components

The primary I/O components are low level and directly access the hardware I/O. They are used for the basic analog input, analog output, and digital I/O interfaces.

1. Analog Input

This component initiates an analog to digital conversion from an ADC. It returns the result of the conversion. This component tends to exist in timed loops, but can also be used in free running applications.

2. Analog Output

This component writes a value to a DAC and initiates the digital to analog conversion. It returns no data. This component is commonly used for continuous and discrete output, existing in both timed and free running applications.

3. Digital Input/Output

This is really a collection of components that act on a single hardware resource. A given digital line can be used for input, output, or bi-directional applications. This component is more commonly used in static DIO applications or as a building block for higher level functionality, with some timed applications.

High Level Components

The DIO lines are the resources most commonly used to build higher level I/O components. These are components that interface to digital signals but need some amount of logic or processing to be meaningful, with the best example being counter applications. Note that it is possible to use the analog components for these applications, it is simply not as common. There are many more minor and major variations than listed below, but these are very common examples.

1. Event Counter

This high level component counts active edges on a digital input. It typically offers polarity control over the incoming signal, a means to control the start and stop of counting, and a readable register with the counter data. When used in a timed loop application, this counter typically returns the number of counts during the previous loop iteration.

2. Period Counter

This high level component counts the time between active edges on a digital input. It typically offers polarity control over the incoming signal, a means to control the start and stop of counting, and a readable register with the counter data. When used in a timed loop application, this counter typically returns data for the most recent measured period.

3. Semi Period Counter

This high level component counts the time between opposite edges on a digital input. It typically offers polarity control over the incoming signal, a means to control the start and stop of counting, and a readable register with the counter data. When used in a timed loop application, this counter typically returns data for the most recent measured period.

4. Quadrature Decoder

This high level component increments or decrements based on two digital inputs. It typically offers polarity control over the incoming signals, a means to control the start and stop of counting, and a readable register with the counter data. When used in a timed loop application, this counter typically returns the final counter value during the previous loop iteration.

5. PWM Input

This high level component counts the high and low times of a pulse train. It typically offers polarity control over the incoming signal, a means to control the start and stop of counting, and a readable register with the counter data.

When used in a timed loop application, this counter typically returns data for the most recent measured high and low periods.

6. PWM Output

This high level component generates a pulse train with controllable high and low times. It typically offers polarity control over the generated signal, a means to control the start and stop of generation, and two writeable registers for period data. When used in a timed loop application, this counter is typically configured to run at a multiple of the loop rate for synchronous behavior.

Grouping of Components

The components by themselves do not provide much functionality. It is the grouping of the components in structured wrappers that define a particular configuration. These wrappers provide the timing and triggering of the components as well as the interface to the host diagram. These wrappers can be grouped into classes of functionality.

1. Free Running

This configuration resembles a PLC in that it continuously samples and updates it's I/O as fast as possible. The input registers always contain the most recent data, and can be read at any time. The output registers can be written at any time, and the outputs will be updated as soon as possible. It is the simplest of the configurations in that there is no real timing, triggering, or data transfer synchronization issues for the customer.

Recommended Permutations

Different counter I/O combinations

2. Continuous Timed Loop

This configuration provides a single timed loop for all synchronous resources. This is well suited to control loops with fully correlated I/O. The host is notified when it is time to access the I/O resources.

Recommended Permutations

SW & HW triggered
Mixes of synch/asynch DIO
Mixes of counter I/O
Different transfer mechanisms (Poll, Interrupt, DMA)

3. Post Trigger Acquisition

This configuration provides the typical post triggered data acquisition functionality. A fixed number of points will be acquired when a SW or HW trigger is received. The same behavior is provided in different combinations for the other resources.

Recommended Permutations

Single and independent loops per resource type
SW & HW triggered
Mixes of synch/asynch DIO
Mixes of counter I/O
Different transfer mechanisms (Poll, Interrupt, DMA)

4. Pre Trigger Acquisition

This configuration provides the typical pre triggered data acquisition functionality. A minimum number of pre trigger points will be acquired, and a post trigger will cause a fixed number of remaining samples to be taken. Note that there is not a comparable model for the output resources.

Recommended Permutations

Single and independent loops per resource type
SW & HW triggered
Mixes of synch/asynch DIO
Mixes of counter I/O
Different transfer mechanisms (Poll, Interrupt, DMA)

It should be noted that the above are meant to be illustrative examples of reconfigurable configurations, and are not meant to limit the scope or form of configurations usable in the reconfigurable system. Other features which may be considered configuring the reconfigurable system 110 include, but are not limited to, other I/O features such as the number of channels, resolution, rates, protection, range, simultaneity and/or synchronization, and enhanced I/O functionality; timing models, including continuous, post trigger, and independent loops; signal conditioning, e.g., sensor interface; form factor, e.g., PXI, PCI, standalone, etc.; and environmental conditions, such as vibration, temperature range, humidity, among others.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A memory medium comprising program instructions for debugging a program, wherein the program is intended for deployment on a programmable hardware element to perform a function, wherein the program instructions are executable to perform:

a) converting a first portion of the program into a first hardware configuration program which is deployable on the programmable hardware element to perform a corresponding first portion of the function, wherein the first portion of the program comprises debugged program instructions, and wherein a remaining portion of the program is to be debugged by a user;

b) configuring the programmable hardware element with the first hardware configuration program;

c) executing the program, wherein said executing comprises:

the programmable hardware element executing the first portion of the program; and the computer system executing the remaining portion of the program;

wherein the remaining portion of the program is operable to be analyzed and debugged in response to said executing;

d) receiving user input modifying the remaining portion of the program to debug the remaining portion of the program, and adjusting respective sizes of the first portion and the remaining portion based on the debugging; and repeating a)-d) one or more times in an iterative manner to debug the program, wherein for one or more iterations, said adjusting comprises moving debugged program instructions from the remaining portion to the first portion to increase the size of the first portion of the program.

2. The memory medium of claim 1, wherein for one or more other iterations, said adjusting comprises moving program instructions from the first portion to the remaining portion for further debugging, thereby decreasing the size of the first portion of the program.

3. The memory medium of claim 1, wherein the program instructions are further executable to implement:
after the program has been debugged,
converting the program into a second hardware configuration program which is deployable on the programmable hardware element to perform the function; and
configuring the programmable hardware element with the second hardware configuration program.

4. The memory medium of claim 1,
wherein said converting the first portion of the program into a first hardware configuration program comprises receiving user input indicating the first portion of the program.

5. The memory medium of claim 1, wherein the programmable hardware element is coupled to one or more hardware resources, and wherein said executing further comprises:
invoking the one or more hardware resources to perform the function.

6. The memory medium of claim 5, wherein the program is specified to access the one or more hardware resources, and wherein the program instructions are further executable to perform:
prior to said configuring the programmable hardware element with the first hardware configuration program, analyzing the remaining portion of the program and the one or more hardware resources;
determining a test feed-through configuration based on said analyzing, wherein the test feed-through configuration is deployable on the programmable hardware element to provide for communication between the remaining portion of the program and the one or more hardware resources; and
including the test feed-through configuration in the first hardware configuration program;
wherein said configuring the programmable hardware element with the first hardware configuration program further comprises configuring the programmable hardware element with the test feed-through configuration; and
wherein said executing the remaining portion of the program further comprises the remaining portion of the program communicating with the one or more hardware resources through the programmable hardware element.

7. The memory medium of claim 6, wherein said determining a test feed-through configuration and said including the test feed-through configuration in the first hardware configuration program are performed only if the remaining portion of the program is specified to access the one or more hardware resources.

8. The memory medium of claim 6, wherein said determining the test feed-through configuration comprises modifying the test feed-through configuration based on said analyzing the remaining portion of the program.

9. The memory medium of claim 6, wherein the program instructions are further executable to perform:
determining the one or more hardware resources.

10. The memory medium of claim 9, wherein said determining the one or more hardware resources comprises:
receiving user input indicating the one or more hardware resources.

11. The memory medium of claim 9, wherein said determining the one or more hardware resources comprises:
querying the one or more hardware resources.

12. The memory medium of claim 6, wherein said determining the test feed-through configuration comprises:
determining a plurality of pre-compiled hardware configuration program components; and
assembling the plurality of pre-compiled hardware configuration program components, thereby generating the test feed-through configuration.

13. The memory medium of claim 6, wherein said determining the test feed-through configuration comprises:
generating a test feed-through software program based on said analyzing; and
compiling the test feed-through software program, thereby generating the test feed-through configuration.

14. The memory medium of claim 13, wherein the program instructions are further executable to perform:
storing the test feed-through configuration on the computer system, wherein the stored test feed-through configuration is retrievable for use in other reconfigurable systems using the one or more hardware resources.

15. The memory medium of claim 6, wherein said determining the test feed-through configuration comprises:
determining a plurality of pre-compiled hardware configuration program components;
assembling the plurality of pre-compiled hardware configuration program components, thereby generating a first portion of the test feed-through configuration;
generating a test feed-through software program based on said analyzing;
compiling the test feed-through software program, thereby generating a second portion of the test feed-through configuration; and
combining the first portion of the test feed-through configuration and the second portion of the test feed-through configuration, thereby generating the test feed-through configuration.

16. The memory medium of claim 6, wherein at least a subset of the one or more hardware resources comprises one or more hardware cartridges.

17. The memory medium of claim 16, wherein at least one of the one or more hardware cartridges comprises an I/O cartridge.

18. The memory medium of claim 1, wherein the first portion of the program comprises a substantially debugged portion of the program.

19. The memory medium of claim 1, wherein the computer system executing the remaining portion of the program simulates execution of the remaining portion of the program on the programmable hardware element.

20. A memory medium comprising program instructions for debugging a program, wherein the program is usable to configure a reconfigurable system, wherein the program performs a function, wherein the reconfigurable system includes a programmable hardware element, wherein the program is intended for deployment on the programmable hardware element, wherein the program instructions are executable to perform:
a) receiving user input indicating a first portion of the program for deployment on the programmable hardware element, wherein the first portion of the program comprises debugged program instructions, and wherein a remaining portion of the program is to be debugged by a user;
b) converting the first portion of the program into a first hardware configuration program which is deployable on the programmable hardware element to perform a corresponding first portion of the function;

c) configuring the programmable hardware element with the first hardware configuration program;
d) executing the program, wherein said executing comprises:
   the programmable hardware element executing the first portion of the program; and
   the computer system executing the remaining portion of the program;
wherein the remaining portion of the program is operable to be analyzed and debugged in response to said executing;
e) receiving user input modifying the remaining portion of the program to debug the remaining portion of the program, and adjusting respective sizes of the first portion and the remaining portion based on the debugging; and
repeating a)-e) one or more times in an iterative manner, wherein for one or more iterations, said adjusting comprises moving debugged program instructions from the remaining portion to the first portion to increase the size of the first portion of the program.

21. The memory medium of claim 20, wherein the program instructions are further executable to implement:
   after the program has been debugged,
      converting the program into a second hardware configuration program which is deployable on the programmable hardware element to perform the function; and
      configuring the programmable hardware element with the second hardware configuration program.

22. The memory medium of claim 20, wherein for one or more other iterations, said adjusting comprises moving program instructions from the first portion to the remaining portion for farther debugging, thereby decreasing the size of the first portion of the program.

23. A memory medium comprising program instructions for debugging a program, wherein the program is usable to configure a reconfigurable system, wherein the program performs a function, wherein the reconfigurable system includes a programmable hardware element, wherein the program is intended for deployment on the programmable hardware element, wherein the program instructions are executable to perform:
   receiving user input indicating a first portion of the program for deployment on the programmable hardware element, wherein the first portion of the program comprises debugged program instructions, and wherein a first remaining portion of the program is to be debugged by a user;
   converting the first portion of the program into a first hardware configuration program which is deployable on the programmable hardware element to perform a corresponding first portion of the function;
   configuring the programmable hardware element with the first hardware configuration program;
   executing the program, wherein said executing comprises:
      the programmable hardware element executing the first portion of the program; and
      the computer system executing the first remaining portion of the program;
   wherein the remaining portion of the program is operable to be analyzed and debugged in response to said executing;
   receiving user input modifying the remaining portion of the program to debug the remaining portion of the program;
   receiving user input indicating a second portion of the program for deployment on the programmable hardware element, wherein the second portion of the program comprises the first portion of the program and a debugged portion of the first remaining portion of the program, wherein a second remaining portion of the program is to be debugged by a user, wherein the second remaining portion comprises only a subset of the first remaining portion of the program;
   converting the second portion of the program into a first hardware configuration program which is deployable on the programmable hardware element to perform a corresponding first portion of the function;
   configuring the programmable hardware element with the first hardware configuration program;
   executing the program, wherein said executing comprises:
      the programmable hardware element executing the second portion of the program; and
      the computer system executing the second remaining portion of the program.

24. A system for debugging a program, wherein the program is intended for deployment on a programmable hardware element to perform a function, the system comprising:
   a reconfigurable device, comprising:
      a programmable hardware element; and
   a computer system comprising a processor and a memory;
      wherein the computer system is coupled to the reconfigurable device;
   wherein the memory stores program instructions which are executable by the processor to:
   a) convert a first portion of the program into a first hardware configuration program which is deployable on the programmable hardware element to perform a corresponding first portion of the function, wherein the first portion of the program comprises debugged program instructions, and wherein a remaining portion of the program is to be debugged by a user;
   b) configure the programmable hardware element with the first hardware configuration program;
   c) execute the program, wherein in executing the program:
      the programmable hardware element executes the first portion of the program; and
      the computer system executes the remaining portion of the program;
      wherein the remaining portion of the program is operable to be analyzed and debugged in response to said executing;
   d) receive user input modifying the remaining portion of the program to debug the remaining portion of the program, and adjusting respective sizes of the first portion and the remaining portion based on the debugging; and
   repeat a)-d) one or more times in an iterative manner, wherein for one or more iterations, said adjusting comprises moving debugged program instructions from the remaining portion to the first portion to increase the size of the first portion of the program.

25. The system of claim 24, wherein for one or more other iterations, said adjusting comprises moving program instructions from the first portion to the remaining portion for further debugging, thereby decreasing the size of the first portion of the program.

26. The system of claim 24, wherein the program instructions are further executable to:
   after the program has been debugged, convert the program into a second hardware configuration program which is deployable on the programmable hardware element to perform the function; and
configure the programmable hardware element with the second hardware configuration program.

27. A system for debugging a program, wherein the program is intended for deployment on a programmable hardware element to perform a function, comprising:
means for a) converting a first portion of the program into a first hardware configuration program which is deployable on the programmable hardware element to perform a corresponding first portion of the function, wherein the first portion of the program comprises debugged program instructions, and wherein a remaining portion of the program is to be debugged by a user;
means for b) configuring the programmable hardware element with the first hardware configuration program;
means for c) executing the program, wherein said executing comprises:
the programmable hardware element executing the first portion of the program; and
the computer system executing the remaining portion of the program;
wherein the remaining portion of the program is operable to be analyzed and debugged in response to said executing;
means for d) receiving user input modifying the remaining portion of the program to debug the remaining portion of the program, and adjusting respective sizes of the first portion and the remaining portion based on the debugging; and
means for repeating a)-d) one or more times in an iterative manner, wherein for one or more iterations, said adjusting comprises moving debugged program instructions from the remaining portion to the first portion to increase the size of the first portion of the program.

28. The system of claim 27, wherein for one or more other iterations, said adjusting comprises moving program instructions from the first portion to the remaining portion for further debugging, thereby decreasing the size of the first portion of the program.

29. The system of claim 27, further comprising:
after the program has been debugged,
means for converting the program into a second hardware configuration program which is deployable on the programmable hardware element to perform the function;
means for configuring the programmable hardware element with the second hardware configuration program.

30. A method for debugging a program, wherein the program is intended for deployment on a programmable hardware element to perform a function, the method comprising:
a) converting a first portion of the program into a first hardware configuration program which is deployable on the programmable hardware element to perform a corresponding first portion of the function, wherein the first portion of the program comprises debugged program instructions, and wherein a remaining portion of the program is to be debugged by a user;
b) configuring the programmable hardware element with the first hardware configuration program;
c) executing the program, wherein said executing comprises:
the programmable hardware element executing the first portion of the program; and
the computer system executing the remaining portion of the program;
wherein the remaining portion of the program is operable to be analyzed and debugged in response to said executing; and
d) receiving user input modifying the remaining portion of the program to debug the remaining portion of the program, and adjusting respective sizes of the first portion and the remaining portion based on the debugging; and
repeating a)-d) one or more times in an iterative manner, wherein for one or more iterations, said adjusting comprises moving debugged program instructions from the remaining portion to the first portion to increase the size of the first portion of the program.

31. The method of claim 30, wherein for one or more other iterations, said adjusting comprises moving program instructions from the first portion to the remaining portion for further debugging, thereby decreasing the size of the first portion of the program.

32. The method of claim 30, the method further comprising: after the program has been debugged,
converting the program into a second hardware configuration program which is deployable on the programmable hardware element to perform the function; and
configuring the programmable hardware element with the second hardware configuration program.

* * * * *